(12) United States Patent
Wijnands et al.

(10) Patent No.: US 10,164,794 B2
(45) Date of Patent: Dec. 25, 2018

(54) BRIDGING OF NON-CAPABLE SUBNETWORKS IN BIT INDEXED EXPLICIT REPLICATION

(71) Applicant: Cisco Technology, Inc., San Jose, CA (US)

(72) Inventors: Ijsbrand Wijnands, Leuven (BE); Neale D. R. Ranns, Basingstoke (GB); Gregory J. Shepherd, Eugene, OR (US); Nagendra Kumar Nainar, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/582,090

(22) Filed: Apr. 28, 2017

(65) Prior Publication Data

US 2018/0316520 A1 Nov. 1, 2018

(51) Int. Cl.
*H04L 12/18* (2006.01)
*H04L 12/46* (2006.01)
(Continued)

(52) U.S. Cl.
CPC .......... *H04L 12/4625* (2013.01); *H04L 45/50* (2013.01); *H04L 45/745* (2013.01)

(58) Field of Classification Search
CPC .... H04L 12/4625; H04L 45/745; H04L 45/50
See application file for complete search history.

(56) References Cited

U.S. PATENT DOCUMENTS

| 5,138,615 A | 8/1992 | Lamport | 370/400 |
|---|---|---|---|
| 5,764,624 A | 6/1998 | Endo | 370/218 |

(Continued)

FOREIGN PATENT DOCUMENTS

| CN | 1754 353 | 3/2006 | |
|---|---|---|---|
| CN | 101385 275 | 3/2009 | ............. H04L 12/18 |

(Continued)

OTHER PUBLICATIONS

Wijnands, Ijsbrand et al., "Bit Indexed Explicit Replication Using Internet Protocol Version 6"; U.S. Appl. No. 15/919,552, filed Mar. 13, 2018, consisting of Specification, Claims, Abstract, and Drawings (49 pages).

(Continued)

*Primary Examiner* — Phuc Tran
(74) *Attorney, Agent, or Firm* — Campbell Stephenson LLP

(57) ABSTRACT

Methods and network devices are disclosed for traversal, within a network configured for bit indexed forwarding, of a subnetwork having nodes not configured for bit indexed forwarding. In one embodiment, a method includes receiving, from a first network node not configured for bit indexed forwarding, a data message comprising a local label and a message bit array. Bit values in the message bit array identify intended destination nodes for the message. The embodiment further includes modifying the message bit array to exclude as intended destination nodes for the message any nodes not represented by one or more relative bit positions associated with the local label and stored in an ingress filter data structure. In addition, the embodiment includes forwarding a copy of the data message to a second network node, which is configured for bit indexed forwarding, identified in an accessed entry of a bit indexed forwarding table.

20 Claims, 18 Drawing Sheets

(51) Int. Cl.
  *H04L 12/723* (2013.01)
  *H04L 12/741* (2013.01)

(56) References Cited

U.S. PATENT DOCUMENTS

| | | | | |
|---|---|---|---|---|
| 5,999,531 | A | 12/1999 | Ferolito | 370/390 |
| 6,148,000 | A | 11/2000 | Feldman | 370/394 |
| 6,240,188 | B1 | 5/2001 | Dondeti | 380/284 |
| 6,615,336 | B1 | 9/2003 | Chen | 370/351 |
| 6,771,673 | B1 | 8/2004 | Baum | 370/535 |
| 6,778,532 | B1 | 8/2004 | Akahane | 370/389 |
| 7,111,101 | B1 | 9/2006 | Bourke | 326/40 |
| 7,519,733 | B1 | 4/2009 | Thubert | 709/232 |
| 7,551,599 | B2 | 6/2009 | Levit | 370/254 |
| 7,925,778 | B1 | 4/2011 | Wijnands | 370/389 |
| 8,320,374 | B2 | 11/2012 | de Heer | 370/390 |
| 8,325,726 | B2 | 12/2012 | Baban et al. | 370/390 |
| 8,670,146 | B1* | 3/2014 | Van Couvering | G06Q 10/10 358/1.15 |
| 8,774,179 | B1 | 7/2014 | Gaggara | 370/389 |
| 8,787,400 | B1 | 7/2014 | Barth | 370/419 |
| 8,830,826 | B2 | 9/2014 | Chen | 370/228 |
| 8,848,728 | B1 | 9/2014 | Revah | 370/386 |
| 8,880,869 | B1 | 11/2014 | Shah | 713/151 |
| 8,890,903 | B2* | 11/2014 | Russell | G09G 3/346 345/690 |
| 8,942,256 | B1 | 1/2015 | Barth | 370/255 |
| 9,065,766 | B2 | 6/2015 | Matsuoka | |
| 9,455,918 | B1 | 9/2016 | Revah | |
| 2002/0126661 | A1 | 9/2002 | Ngai | 370/380 |
| 2002/0191628 | A1 | 12/2002 | Liu | 370/428 |
| 2003/0043802 | A1 | 3/2003 | Yazaki | 370/389 |
| 2003/0088696 | A1 | 5/2003 | McCanne | 709/238 |
| 2003/0142685 | A1 | 7/2003 | Bare | 370/410 |
| 2003/0210695 | A1 | 11/2003 | Henrion | 370/392 |
| 2004/0240442 | A1 | 12/2004 | Grimminger | 370/389 |
| 2004/0264374 | A1 | 12/2004 | Yu | 370/230 |
| 2005/0169270 | A1 | 8/2005 | Mutou | 370/390 |
| 2005/0181807 | A1 | 8/2005 | Dowling | |
| 2005/0232272 | A1 | 10/2005 | Deng | 370/390 |
| 2006/0133298 | A1 | 6/2006 | Ng | 370/254 |
| 2006/0182035 | A1 | 8/2006 | Vasseur | 370/238 |
| 2006/0187817 | A1 | 8/2006 | Charzinski | 370/216 |
| 2006/0280192 | A1 | 12/2006 | Desanti | 370/409 |
| 2006/0291444 | A1 | 12/2006 | Alvarez | 370/351 |
| 2007/0127474 | A1 | 6/2007 | Mirtorabi et al. | 370/390 |
| 2007/0189291 | A1 | 8/2007 | Tian | 370/390 |
| 2008/0069125 | A1 | 3/2008 | Reed | 370/410 |
| 2008/0159285 | A1 | 7/2008 | De Heer | 370/390 |
| 2008/0165783 | A1 | 7/2008 | Desanti | 370/392 |
| 2008/0194240 | A1 | 8/2008 | Dowling | 455/414.3 |
| 2008/0212465 | A1 | 9/2008 | Yan | 370/225 |
| 2008/0240105 | A1* | 10/2008 | Abdallah | H04L 12/66 370/392 |
| 2009/0067348 | A1 | 3/2009 | Vasseur | 370/256 |
| 2009/0185549 | A1 | 7/2009 | Shon | 370/379 |
| 2009/0213735 | A1 | 8/2009 | Check | 370/236 |
| 2009/0219817 | A1 | 9/2009 | Carley | 370/235.1 |
| 2009/0310610 | A1 | 12/2009 | Sandstrom | 370/394 |
| 2010/0046515 | A1 | 2/2010 | Wong | 370/390 |
| 2011/0202761 | A1 | 8/2011 | Sarela et al. | 716/163 |
| 2011/0228770 | A1 | 9/2011 | Dholakia | 370/390 |
| 2011/0274112 | A1 | 11/2011 | Czaszar | 370/392 |
| 2011/0299531 | A1 | 12/2011 | Yu | 370/392 |
| 2012/0075988 | A1 | 3/2012 | Lu | 370/218 |
| 2012/0099591 | A1 | 4/2012 | Kotha | 370/392 |
| 2012/0106560 | A1 | 5/2012 | Gumaste | 370/401 |
| 2012/0236857 | A1 | 9/2012 | Manzella | 370/390 |
| 2012/0243539 | A1 | 9/2012 | Keesara | |
| 2013/0034097 | A1 | 2/2013 | Dharmapurikar | 370/390 |
| 2013/0051376 | A1 | 2/2013 | Hatashita | 370/338 |
| 2013/0114595 | A1 | 5/2013 | Mack-Crane | 370/390 |
| 2013/0114619 | A1 | 5/2013 | Wakumoto | 370/406 |
| 2013/0136117 | A1 | 5/2013 | Schrum, Jr. | 370/338 |
| 2013/0170450 | A1 | 7/2013 | Anchan | 370/329 |
| 2013/0201988 | A1 | 8/2013 | Zhou | 370/390 |
| 2013/0308948 | A1 | 11/2013 | Swinkels | 398/66 |
| 2013/0336315 | A1 | 12/2013 | Guichard | 370/389 |
| 2013/0343384 | A1 | 12/2013 | Shepherd | 370/390 |
| 2014/0010223 | A1 | 1/2014 | Wang | 370/338 |
| 2014/0043964 | A1 | 2/2014 | Gabriel | 370/229 |
| 2014/0098813 | A1 | 4/2014 | Mishra | 370/390 |
| 2014/0119191 | A1 | 5/2014 | Onoue | 370/236 |
| 2014/0160925 | A1 | 6/2014 | Xu | 370/235 |
| 2014/0189174 | A1 | 7/2014 | Ajanovic | 710/106 |
| 2015/0003458 | A1 | 1/2015 | Li | 370/392 |
| 2015/0009823 | A1 | 1/2015 | Ganga | 370/235 |
| 2015/0023328 | A1 | 1/2015 | Thubert et al. | 370/336 |
| 2015/0049760 | A1 | 2/2015 | Xu | 370/390 |
| 2015/0078377 | A1 | 3/2015 | Wijnands et al. | 370/390 |
| 2015/0078378 | A1 | 3/2015 | Wijnands et al. | 370/390 |
| 2015/0078379 | A1 | 3/2015 | Wijnands et al. | 370/390 |
| 2015/0078380 | A1 | 3/2015 | Wijnands et al. | 370/390 |
| 2015/0081941 | A1 | 3/2015 | Brown | 710/116 |
| 2015/0085635 | A1 | 3/2015 | Wijnands et al. | 370/216 |
| 2015/0092546 | A1 | 4/2015 | Baratam | 370/230 |
| 2015/0131658 | A1 | 5/2015 | Wijnands et al. | 370/390 |
| 2015/0131659 | A1 | 5/2015 | Wijnands et al. | 370/390 |
| 2015/0131660 | A1 | 5/2015 | Shepherd et al. | 370/390 |
| 2015/0138961 | A1 | 5/2015 | Wijnands et al. | 370/228 |
| 2015/0139228 | A1 | 5/2015 | Wijnands et al. | 370/390 |
| 2015/0181309 | A1 | 6/2015 | Wijnands et al. | 725/109 |
| 2015/0334006 | A1 | 11/2015 | Shao | 370/225 |
| 2016/0119159 | A1 | 4/2016 | Zhao | 370/390 |
| 2016/0127142 | A1 | 5/2016 | Tian et al. | 370/390 |
| 2016/0142248 | A1 | 5/2016 | Thubert et al. | 370/372 |
| 2016/0182353 | A1 | 6/2016 | Garcia-Luna-Aceves | 709/241 |
| 2016/0191372 | A1 | 6/2016 | Zhang | 370/390 |
| 2016/0205588 | A1 | 7/2016 | Liu | 370/392 |
| 2016/0218961 | A1 | 7/2016 | Lindem | 370/389 |
| 2016/0254987 | A1 | 9/2016 | Eckert et al. | 370/390 |
| 2016/0254988 | A1 | 9/2016 | Eckert et al. | 370/390 |
| 2016/0254991 | A1* | 9/2016 | Eckert | H04L 12/4633 370/225 |
| 2017/0099232 | A1* | 4/2017 | Shepherd | H04L 47/806 |
| 2017/0142006 | A1 | 5/2017 | Wijnands et al. | 370/390 |

FOREIGN PATENT DOCUMENTS

| | | | |
|---|---|---|---|
| CN | 101572667 | 11/2009 | |
| CN | 102025538 | 4/2011 | |
| CN | 102577 238 | 7/2012 | H04L 12/18 |
| WO | WO 2007/095331 | 8/2007 | |

OTHER PUBLICATIONS

Wijnands, Ijsbrand et al., "Area Specific Broadcasting Using Bit Indexed Explicit Replication"; U.S. Appl. No. 15/347,443, filed Nov. 9, 2016; consisting of Specification, Claims, Abstract, and Drawings (65 pages).

Wang, Xiaorong et al., "Multicast Traffic Steering Using Tree Identity in Bit Indexed Explicit Replication (BIER)," U.S. Appl. No. 15/474,583, filed Mar. 30, 2017; consisting of Specification, Claims, Abstract, and Drawings (97 pages).

Wang, Xiaorong et al.,et al., "Internet Protocol Based Encapsulation for Bit Indexed Explicit Replication (BIER)"; U.S. Appl. No. 15/487,626, filed Apr. 14, 2017; consisting of Specification, Claims, Abstract, and Drawings (94 pages).

Wijnands, Ijsbrand et al., "Unicast Media Replication Fabric Using Bit Indexed Explicit Replication," U.S. Appl. No. 15/581,806, filed Apr. 28, 2017; consisting of Specification, Claims, Abstract, and Drawings (64 pages).

Wijnands, Ijsbrand et al., "Bridging of Non-Capable Subnetworks in Bit Indexed Explicit Replication," U.S. Appl. No. 15/582,090, filed Apr. 28, 2017; consisting of Specification, Claims, Abstract, and Drawings (68 pages).

Aggarwal, R., et al., "BGP Encodings and Procedures for Multicast in MPLS/BGP IP VPNs," Internet Engineering Task Force (IETF), Request for Comments 6514, Feb. 2012, pp. 1-59.

(56) References Cited

OTHER PUBLICATIONS

Aguilar, L., "Datagram Routing for Internet Multicasting," SRI International, Menlo Park, California, ACM SIGCOMM Computer Communication Review Newsletter, vol. 14, Issue 2, Jun. 1984, pp. 58-63.

Artel Video Systems, White Paper; "The Broadcaster's Guide to SMPTE 2022: Applications in Video Contribution and Distribution," Oct. 2014, pp. 1-7.

Bates, T. et al.; "Multiprotocol Extensions for BGP-4," Network Working Group, Request for Comments 4760, Jan. 2007, pp. 1-12.

Boivie, Rick, and N. Feldman, IBM Watson Research Center; "Small Group Multicast," draft-boivie-sgm-02.txt, Internet-Draft, Feb. 2001, pp. 1-17.

Boivie, Rick, et al., "Explicit Multicast (Xcast) Concepts and Options, draft-ooms-xcast-basic-spec-13.txt," Internet-Draft, Jul. 2007, pp. 1-34.

Cisco Systems, Inc., "Multi-Topology Routing," Feb. 2007, pp. 1-72.

Cisco Systems, Inc., White Paper, "Diffserv—The Scalable End-To-End Quality of Service Model," Aug. 2005, pp. 1-18.

Das, Kaushik, "IPv6 Header Deconstructed"; http://www.ipv6.com/articles/general/lPv6-Header.htm; Apr. 18, 2008; 2 pages.

Deering, S., Cisco Systems, Inc. and R. Hinden, Nokia;"Internet Protocol, Version 6 (IPv6)," Network Working Group, Request for Comments 2460, Dec. 1998, pp. 1-39.

Eckert, T., "Traffic Engineering for Bit Index Explicit Replication BIER-TE, draft-eckert-bier-te-arch-00," Network Working Group, Internet-Draft, Mar. 5, 2015, pp. 1-21.

Eckert, T., et al., "Traffic Engineering for Bit Index Explicit Replication BIER-TE, draft-eckert-bier-te-arch-01," Network Working Group, Internet-Draft, Jul. 5, 2015, pp. 1-23.

Gharai, L. et al., "RTP Payload Format for Society of Motion Picture and Television Engineers (SMPTE) 292M Video," Network Working Group, Request for Comments 3497, Mar. 2003, pp. 1-12.

Hinden, R., Nokia and S. Deering, Cisco Systems, Inc.; "IP Version 6 Addressing Architecture," Network Working Group, Request for Comments 4291, Feb. 2006, pp. 1-25.

Kompella, K. et al., "The Use of Entropy Labels in MPLS Forwarding," Internet Engineering Task Force (IETF), Request for Comments 6790, Nov. 2012, pp. 1-25.

Kumar, N. et al., Cisco Systems, Inc., "OSPF Extension for Bit Index Explicit Replication, draft-kumar-ospf-bier-extension-00," Internet-Draft, May 19, 2014, pp. 1-7.

Kumar, N., et al., "BIER Use Cases, draft-kumar-bier-use-cases-00," Network Working Group, Internet-Draft, Oct. 25, 2014, pp. 1-7.

Laabs, Matthias, "SDI over IP—Seamless Signal Switching in SMPTE 2022-6 and a Novel Multicast Routing Concept," EBU Technical Review, 2012 Q4, pp. 1-7.

Li, Tony et al., "IGP Requirements for Traffic Engineering With MPLS, draft-li-mpls-igp-te-00.txt," Network Working Group, Internet-Draft, Feb. 1999, pp. 1-6.

Microsoft, "IPv6 Addressing (TechRef)"; Apr. 3, 2011; https://technet.microsoft.com/en-us/library/dd392266(v=ws.10).aspx; pp. 1-30.

Moy, J., Ascend Communications, Inc., "OSPF Version 2," Network Working Group, Request for Comments 2328, Apr. 1998, pp. 1-244.

Przygienda, T. et al., "M-ISIS: Topology (MT) Routing in Intermediate System to Intermediate Systems (IS-ISs)," Network Working Group, Request for Comments 5120, Feb. 2008, pp. 1-14.

Psenak, P. et al., "Multi-Topology (MT) Routing in OSPF," Network Working Group, Request for Comments 4915, Jun. 2007, pp. 1-20.

Psenak, P. et al., Cisco Systems; "OSPF Extensions for BIER, draft-psenak-ospf-bier-extensions-00," OSPF, Internet-Draft, Sep. 27, 2014, pp. 1-6.

Psenak, P. et al., Cisco Systems; "OSPF Extensions for BIER, draft-psenak-ospf-bier-extensions-01," OSPF, Internet-Draft, Oct. 24, 2014, pp. 1-8.

Psenak, P. et al., "OSPF Extensions for Segment Routing, draft-psenak-ospf-segment-routing-extension-05," Open Shortest Path First IGP, Internet-Draft, Jun. 2014, pp. 1-33.

Rekhter, Ed. Y. et al., "A Border Gateway Protocol 4 (BGP-4)," Network Working Group, Request for Comments 4271, Jan. 2006, pp. 1-104.

Rosen, Ed. E. et al., "Multicast VPN Using BIER, draft-rosen-l3vpn-mvpn-bier-01," Internet Engineering Task Force, Internet-Draft, Oct. 16, 2014, pp. 1-9.

Schulzrinne, H. et al.,; "RTP: A Transport Protocol for Real-Time Applications," Network Working Group, Request for Comments 3550, Jul. 2003, pp. 1-89.

Shen, Naiming et al., "Calculating IGP Routes Over Traffic Engineering Tunnels, draft-ietf-rtgwg-igp-shortcut-01.txt," Network Working Group, Internet-Draft, May 2004, pp. 1-7.

Shen, N. et al., "Calculating Interior Gateway Protocol (IGP) Routes Over Traffic Engineering Tunnels," Network Working Group, Request for Comments 3906, Oct. 2004, pp. 1-8.

SMPTE, "Beyond the Digital Conversion, The Integration of Information Technology and Professional Media, The Convergence of 2 Industries—The Adoption of Information Technology by the Professional Media Industry; Report of the SMPTE Study Group on Media Production System Network Architecture," Mar. 31, 2014, © 2014 by the Society of Motion Picture and Television Engineers, Inc. (SMPTE), pp. 1-65.

SMPTE, "Transport of High Bit Rate Media Signals Over IP Networks (HBRMT)," ST 2022-6:2012, © 2015 by the Society of Motion Picture and Television Engineers, Inc. (SMPTE), p. 1.

SMPTE, "Definition of Vertical Interval Switching Point for Synchronous Video Switching," RP 168:2009, © 2015 by the Society of Motion Picture and Television Engineers, Inc. (SMPTE), p. 1.

Whitcomb, Leigh, "Real-Time Professional Broadcast Signals Over IP Networks," Harris Corporation, Technology Conference, Apr. 2011, pp. 1-60.

Wijnands, Ijsbrand, et al., Cisco Systems, Inc.; "Multipoint Label Distribution Protocol In-Band Signaling in a VPN Context, draft-wijnands-mpls-mldp-vpn-in-band-signaling-00," Internet-Draft, Oct. 7, 2011, pp. 1-13.

Wijnands, Ijsbrand, Cisco Systems, Inc., "Bit Index Explicit Replication using MPLS Encapsulation, draft-wijnands-mpls-bmf-encapsulation-00," Internet-Draft, Feb. 2014, pp. 1-9.

Wijnands, Ijsbrand, et al., "Multicast Using Bit Index Explicit Replication, draft-wijnands-bier-architecture-01," Internet Engineering Task Force, Internet-Draft, Oct. 16, 2014, pp. 1-24.

Wijnands, Ijsbrand, et al., "Multicast Using Bit Index Explicit Replication, draft-wijnands-bier-architecture-02," Internet Engineering Task Force, Internet-Draft, Dec. 4, 2014, pp. 1-27.

Wijnands, Ijsbrand, et al., "Multicast Using Bit Index Explicit Replication, draft-wijnands-bier-architecture-03," Internet Engineering Task Force, Internet-Draft, Jan. 27, 2015; pp. 1-29.

Xu, X. et al., "BIER Encapsulation, draft-xu-bier-encapsulation-00," Network Working Group, Internet-Draft, Sep. 30, 2014, pp. 1-6.

Xu, X. et al., "BIER Encapsulation, draft-xu-bier-encapsulation-01," Network Working Group, Internet-Draft, Oct. 20, 2014, pp. 1-6.

Yongliang Li, et al., Abstract Translation of CN-201010573400-A and CN 102025538, Database EPODOC [Online], European Patent Office, Apr. 20, 2011, pp. 1-2 [XP 002740355 on Extended EP SR].

Aggarwal, et al., "Extensions to Resource Reservation Protocol—Traffic Engineering (RVP-TE) for Point-to-Multipoint TE Label Switched Paths (LSPs)," Network Working Group, Request for Comments 4875, May 2007, pp. 1-53.

* cited by examiner

Bit Indexed Routing Table A 300

| BP | Router ID | Neighbor |
|---|---|---|
| 2 | B | E |
| 3 | C | E |
| 4 | D | E |
| 5 | H | E |

*Fig. 3A*

Bit Indexed Routing Table B 320

| BP | Router ID | Neighbor |
|---|---|---|
| 1 | A | F |
| 3 | C | F |
| 4 | D | F |
| 5 | H | H |

*Fig. 3B*

Bit Indexed Routing Table C 330

| BP | Router ID | Neighbor |
|---|---|---|
| 1 | A | E |
| 2 | B | E |
| 4 | D | E |
| 5 | H | E |

*Fig. 3C*

Bit Indexed Routing Table D 340

| BP | Router ID | Neighbor |
|---|---|---|
| 1 | A | G |
| 2 | B | G |
| 3 | C | G |
| 5 | H | H |

*Fig. 3D*

Bit Indexed Routing Table E 350

| BP | Router ID | Neighbor |
|---|---|---|
| 1 | A | A |
| 2 | B | F |
| 3 | C | C |
| 4 | D | G |
| 5 | H | F / G |

*Fig. 3E*

Bit Indexed Routing Table F 360

| BP | Router ID | Neighbor |
|---|---|---|
| 1 | A | E |
| 2 | B | B |
| 3 | C | E |
| 4 | D | E |
| 5 | H | B |

*Fig. 3F*

Bit Indexed Routing Table G 370

| BP | Router ID | Neighbor |
|---|---|---|
| 1 | A | E |
| 2 | B | E |
| 3 | C | E |
| 4 | D | D |
| 5 | H | D |

*Fig. 3G*

Bit Indexed Label Switching Forwarding Table A 500

| Bit Pos. | Neighbor | NBA | FEC | Inst. | RL |
|---|---|---|---|---|---|
| 1 | local | 000001 | -- | decaps | -- |
| 2 | E | 011110 | A | push | AE1 |
| 3 | E | 011110 | A | push | AE1 |
| 4 | E | 011110 | A | push | AE1 |
| 5 | E | 011110 | A | push | AE1 |

*Fig. 5A*

Forwarding Table E 510

| LL | Neighbor | Inst. | RL |
|---|---|---|---|
| AE1 | C | swap | AC1 |
| | F | swap | AF1 |
| | G | swap | AG1 |

*Fig. 5B*

Forwarding Table F 520

| LL | Neighbor | Inst. | RL |
|---|---|---|---|
| AF1 | B | swap | AB1 |

*Fig. 5C*

Forwarding Table G 530

| LL | Neighbor | Inst. | RL |
|---|---|---|---|
| AG1 | D | swap | AD1 |

*Fig. 5D*

Bit Indexed Forwarding Table B 540

| Bit Pos. | NBA | Neighbor |
|---|---|---|
| 2 | 010010 | local |
| 5 | 010010 | H |

*Fig. 5E*

Bit Indexed Forwarding Table D 550

| Bit Pos. | NBA | Neighbor |
|---|---|---|
| 4 | 011000 | local |
| 5 | 011000 | H |

*Fig. 5F*

BRIDGING OF NON-CAPABLE SUBNETWORKS IN BIT INDEXED EXPLICIT REPLICATION

TECHNICAL FIELD

This disclosure relates generally to network communications and more particularly to traversal of a subnetwork lacking the forwarding capabilities of the overall network.

BACKGROUND

Network nodes forward data. Network nodes may take the form of one or more routers, one or more bridges, one or more switches, one or more servers, or any other suitable communications processing device. The data is commonly formatted as messages and forwarded using forwarding tables. A message is a formatted unit of data that typically contains control information and payload data. Control information may include information that identifies sources and destinations, such as addresses, error detection codes like checksums, sequencing information, etc. Control information is typically found in message headers and trailers. Payload data is typically located between the message headers and trailers. Depending on factors such as the network level and network protocol used, a message may be formatted and/or referred to as one of various specific types such as packets, datagrams, segments, or frames.

Operation of routing mechanisms within a network can be described in terms of a "control plane" and a "data plane." The data plane, also referred to as the "forwarding plane," does the actual forwarding of messages coming into a node. Data plane decisions may involve accessing a forwarding table that relates the appropriate message identifier to the specific network interface, or egress interface, the message should be sent to in order to send it in the right direction. Generating such a forwarding table, based on a map, database, or other information reflecting the topology of the network, is a function of the control plane.

The control plane generates and updates its network topology information using one or more routing protocols. Within an autonomous system, an interior gateway protocol (IGP) can be used for exchanging network topology information between nodes. An autonomous system, or routing domain, as used herein refers to a collection of interconnected network nodes under a common administration for purposes of network configuration. Exchange of routing information between autonomous systems can be done using an exterior gateway protocol such as Border Gateway Protocol (BGP).

The processes involved in forwarding messages in networks may vary depending on the forwarding configuration used. Overall forwarding configurations include unicast, broadcast, and multicast forwarding. Unicast is a method of point-to-point communication most often used when a particular node (known as a source) has instructions to send data to another particular node (known as a receiver) and is not concerned with sending the data to multiple receivers. Broadcast is a method used when a source has instructions to send data to all receivers in a domain, and multicast allows a source to send data to a group of receivers in a domain while preventing the data from being sent to other receivers in the domain.

Multicast is the preferred method of data forwarding for many popular applications, such as streaming media distribution. One reason for this is that multicast is a bandwidth-conserving technology that allows delivery of data to multiple receivers while avoiding transmission of multiple copies of the same message over the same network link. However, in traditional multicast systems, a relatively large amount of control plane information is used. Setting up and maintaining this control information has a tendency to become complex and costly in terms of computing resources, and can become a major limiting factor in overall network performance.

BRIEF DESCRIPTION OF THE DRAWINGS

The present disclosure may be better understood, and its numerous objects, features and advantages made apparent to those skilled in the art, by referencing the accompanying drawings.

FIGS. 3A through 3G illustrate examples of bit indexed routing tables for nodes in one embodiment of the network of FIG. 2A.

FIGS. 5A through 5F illustrate examples of forwarding tables for nodes in one embodiment of the network of FIG. 2A.

DETAILED DESCRIPTION

Overview

Figure 1A:
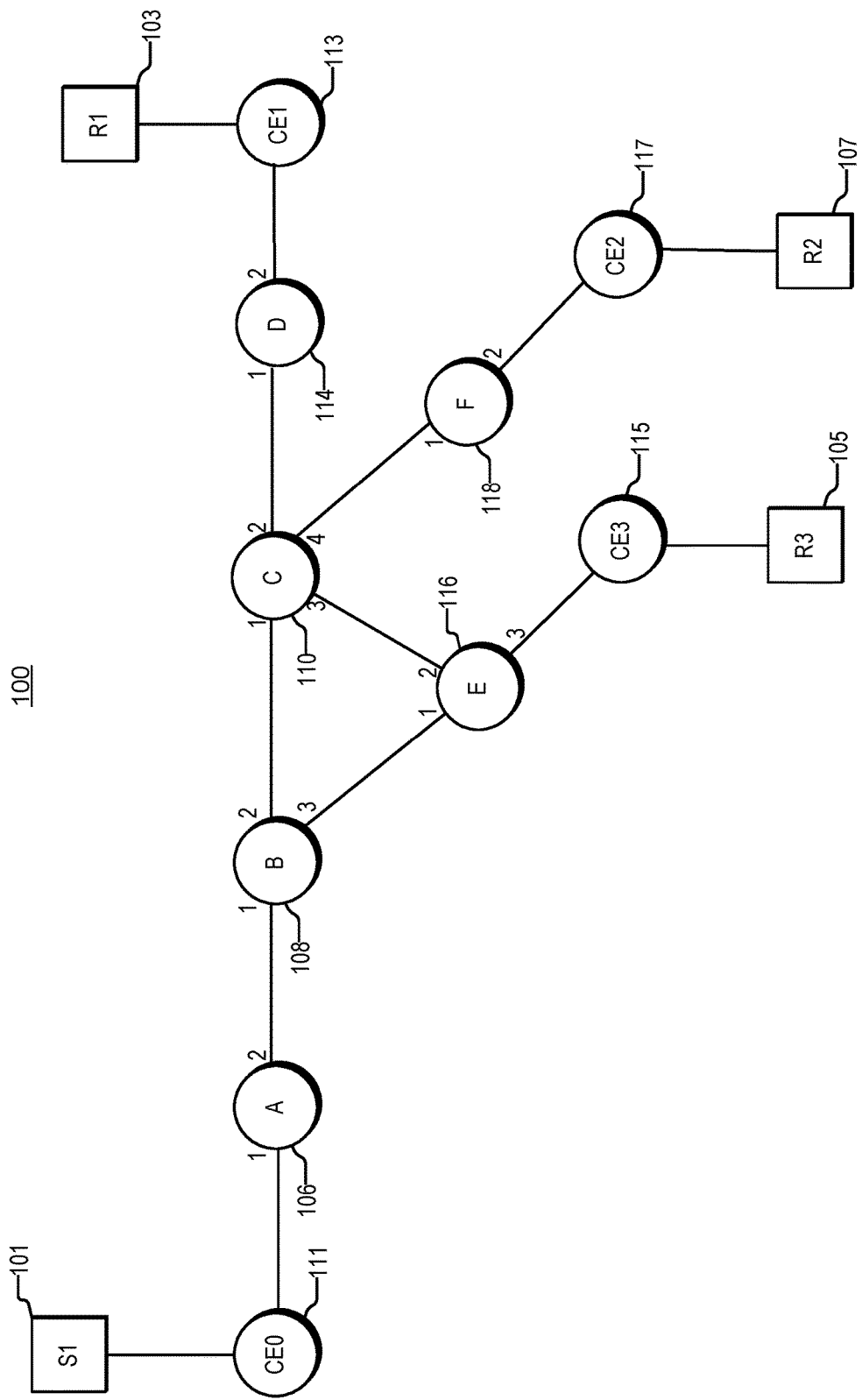
FIG. 1A is a simplified block diagram illustrating certain components of an example network.

Methods and network devices are disclosed for traversal, within a network configured for bit indexed forwarding, of a subnetwork having nodes not configured for bit indexed forwarding. In one embodiment, a method includes receiving, from a first network node not configured for bit indexed forwarding, a data message comprising a local label and a message bit array. Bit values in the message bit array identify intended destination nodes for the message. The embodiment further includes modifying the message bit array to exclude as intended destination nodes for the message any nodes not represented by one or more relative bit positions associated with the local label and stored in an ingress filter data structure. In addition, the embodiment includes forwarding a copy of the data message to a second network node, which is configured for bit indexed forwarding, identified in an accessed entry of a bit indexed forwarding table.

Multicast

Multicast transmission delivers multicast packets (packets that traditionally include information identifying a multicast group, such as a multicast group address) from a source to multiple receivers without unduly burdening the source. Although some of the discussion in this disclosure is in terms of packets, it should be understood that the disclosures made herein may also be applicable to other types of network messages, such as datagrams or data frames. Generally speaking, a multicast receiver is a host (such as a computing device or application) that has subscribed to a multicast group. Instead of the source replicating a multicast packet and sending a copy of the multicast packet to each receiver, the source sends a single copy of a multicast packet and multicast-enabled routers (or, more generally, nodes) replicate the packet at the point(s) where paths to various receivers diverge. Multicast routing protocols enable multicast transmission (i.e., one-to-many connections and many-to-many connections) by replicating a multicast packet close to the destination of that multicast packet, obviating the use of multiple unicast connections for the same purpose. This saves network bandwidth and improves throughput.

Typical multicast routing protocols require that each node's multicast forwarding table include, for example, information that maps source and group identifiers for each multicast flow to the interfaces over which the node must forward a packet replica for that group, and the interface over which a packet for that group should properly arrive. The multicast forwarding tables maintained by each multicast-enabled node can become quite large in networks with many multicast sources, many multicast groups, or both. Maintaining such multicast forwarding tables imposes limitations on network scalability.

Bit Indexed Explicit Replication (BIER)

In a "stateless multicast" technique known as Bit Indexed Explicit Replication (BIER), the amount of state information within a multicast network is reduced. In BIER forwarding, receiver information is encoded in the packet rather than looked up in tables at each node based on multicast source and group information. Specifically, the receiver information is encoded in a bit array carried by the packet. Generally speaking, each node associated with a multicast receiver is assigned a bit position in the bit array. A node connected to a receiver may also be referred to as a "receiver node," a "destination node" or an "egress node" herein. The value of the bit at a given bit position indicates whether the receiver node corresponding to that bit position is an intended receiver, or destination, for the multicast packet carrying the bit array.

In forwarding a BIER multicast packet containing a packet bit array (or, more generally, a BIER multicast message containing a message bit array), a BIER-enabled node determines whether any intended destination nodes for the packet are also reachable nodes from the BIER-enabled node. This is done using a bit indexed forwarding table stored at the BIER-enabled node, the forwarding table having an entry for each of the BIER-enabled node's neighbor (directly connected next-hop) nodes. In an embodiment, the entry for each neighbor node includes a neighbor bit array with the same mapping of bit positions to destination nodes as that of the packet bit array. In a neighbor bit array, however, the value of the bit at a given bit position indicates whether the corresponding receiver node is reachable from the neighboring node associated with the forwarding table entry containing the neighbor bit array. In one embodiment, whether a node is "reachable," for purposes of BIER forwarding, from a neighboring node depends on whether the neighboring node is included in the shortest path to the destination node, as determined through an interior gateway protocol (IGP) used in the network. A message bit array may also be called a "bit string" herein, and a neighbor bit array may be called a "bit mask."

If comparison of the packet bit array of an incoming BIER packet with a neighbor bit array in a forwarding table entry shows that at least one intended destination node for the multicast packet is reachable via a neighbor node, a replica of the multicast packet is forwarded to the neighbor node. In an embodiment, the replica is forwarded using routing information from the forwarding node's unicast routing table. This process is repeated for forwarding table entries associated with any other neighbor nodes, and each forwarded replica packet is in turn handled in a similar manner when received by the respective BIER-enabled neighbor node. In this manner the multicast packet is replicated and forwarded as needed to reach the intended destinations. In some embodiments, modifications are made to a packet bit array during the forwarding process, either as a packet bit array is compared to neighbor bit arrays in successive forwarding table entries at the node, or before a replica packet carrying a packet bit array is forwarded to a neighbor node, or in both situations. Such modifications can prevent looping and replication of packets.

Figure 1B:
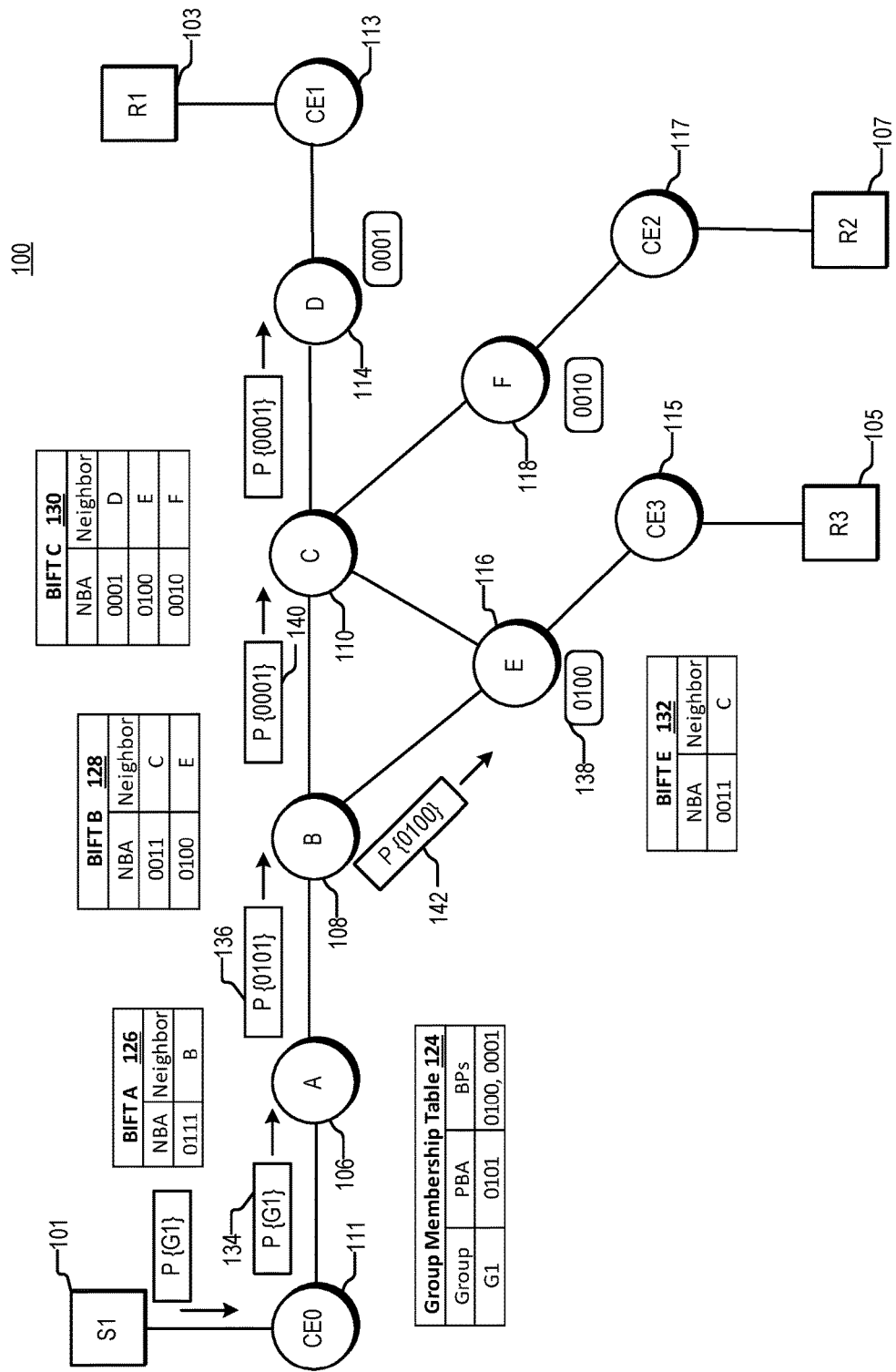
FIG. 1B is a diagram illustrating BIER forwarding through an example network.

Configuration and operation of a BIER-enabled network is described further with reference to FIGS. 1A and 1B. FIG. 1A shows an example network 100. Network 100 includes BIER-enabled nodes 106, 108, 110, 114, 116 and 118. BIER-enabled nodes are configured to forward packets using BIER. For example, BIER-enabled nodes are configured to store and use bit indexed forwarding tables, as explained further below. A BIER-enabled node may also be referred to as a "bit-forwarding router" (BFR) herein. Although "node" and "router" may be used interchangeably herein, the described nodes may in some embodiments be implemented using switches or other devices capable of carrying out the described functions. The BIER-enabled nodes in FIG. 1A form a provider network, or domain. Such a provider network could be employed by an Internet service provider to transport packets to customers. The domain includes core nodes 108 and 110, and provider edge nodes 106, 114, 116, and 118. The provider edge nodes are coupled to customer edge nodes 111, 113, 115, and 117. Hosts 101, 103, 105, and 107 are coupled to the customer edge nodes. In the embodiment of FIG. 1A, host 101 is a multicast source, while hosts 103, 105 and 107 are configured as multicast receivers, or subscribers.

Each of the BIER-enabled nodes 106, 108, 110, 114, 116 and 118 has interfaces that are identified as shown. For example, BIER-enabled node 108 has three interfaces designated 1-3, respectively. Each BIER-enabled node is assigned a unique identifier or routable address known as a router identifier (RID). The RID can be implemented as, for example, an internet protocol (IP) address, prefix, or loopback address. The RID may also be referred to as a "BFR-Prefix" herein. In network 100 and other network diagrams described herein, these unique router identifiers are represented by capital letters such as "A" through "F". Network 100 and the other BIER-enabled networks described herein are not limited to any particular version of IP or to any particular routing or routed protocol at all. In an embodiment, each BIER-enabled node advertises or floods the routable address to all other BIER-enabled nodes in network 100. Each BIER-enabled node builds a unicast topology of the BIER-enabled nodes in network 100 using the advertised routable addresses.

BIER-enabled node 106 is configured as an ingress router for multicast data packets. A BIER-enabled ingress router may also be referred to as a "bit-forwarding ingress router" (BFIR) herein. The ingress router is coupled, via customer edge node 111, to source 101. Multicast data packets from source 101 enter the BIER network via the ingress router (BIER-enabled node 106). Each of BIER-enabled nodes 114, 116, and 118 is configured as an egress router. The egress routers can be connected (directly or via customer edge routers) to hosts, such as receivers, or other networks. An egress router is a BIER-enabled node that is the last BIER-enabled node on a path between a source and a receiver. As such, an egress router is a destination node when forwarding using BIER. The egress router may be a provider edge node that is coupled to the receiver either directly or indirectly (e.g., through a non-BIER-enabled customer edge node). A BIER-enabled egress router may also be referred to as a "bit-forwarding egress router" (BFER) herein.

In an embodiment, receiver information is included in the packet by assigning each edge router in a BIER network a bit position (BP) within a packet bit array carried by the packet (or, more generally, a message bit array carried by a network message). In an embodiment, an edge router assigned a bit position in this manner is also associated with the same relative bit position in a neighbor bit array stored in a bit indexed forwarding table at a BIER-enabled node. Either or both of the packet bit array and neighbor bit array may also be referred to as a bit mask (BM) herein. In some embodiments, the packet bit array is referred to as a bit string or BitString and the neighbor bit array is referred to as a bit mask. As used herein, the term bit array, bit string or bit mask refers to a set of bits that has a fixed or variable length.

Bit Indexed Routing and Forwarding Tables

In an embodiment, each BIER-enabled node in the BIER network uses the BPs and router identifiers (RIDs) of the other BIER-enabled nodes to generate one or more bit indexed routing tables (BIRTs) and bit indexed forwarding tables (BIFTs). A bit indexed routing table is a table that stores BP-to-router identifier mappings. In an embodiment, the BIER-enabled nodes learn about the BP-to-router ID mappings through advertisements sent by the BIER-enabled nodes having assigned bit positions.

In response to a BP being assigned to an egress router, the egress router, in some embodiments, advertises its BP along with its router identifier to some or all of the other nodes in the BIER network. In one embodiment, the ER advertises its BP via an interior gateway protocol (IGP). Within an autonomous system, an IGP is used for exchanging network topology information between nodes (all nodes, whether BIER-enabled or not). There are different types of IGPs, which vary in terms of, for example, the particular information exchanged between nodes, whether information is shared only with neighbor nodes or "flooded" throughout the autonomous system, and how often the exchanged information is updated. In one type of IGP called a link-state routing protocol, every router constructs a topological map of network connectivity in the form of a graph, showing which routers are connected to which other routers. Each router can use its map to independently calculate the best logical path from it to every possible destination in the network. The collection of best paths will then form the routing table. Examples of link-state routing protocols include the intermediate system to intermediate system (IS-IS) and the Open Shortest Path First (OSPF) protocols. Messages called advertisements are used in IGPs to exchange information. Nodes in an IP network automatically exchange network topology information through IGP advertisements.

In an embodiment, ISIS and/or OSPF protocols can be modified to assist in distributing BP-to-router ID mappings through the BIER network using link state updates. In OSPF, such a link state update is called a link-state advertisement (LSA). Certain types of LSAs are "opaque" LSAs which are forwarded through the network even by nodes that do not themselves have the capability to use the information in the LSA. Such opaque LSAs may be useful in networks having both BIER-enabled and non-BIER enabled nodes. Other flooding mechanisms to distribute the information are possible. All BIER-enabled nodes in a BIER network, not just the egress routers, also flood their respective router identifiers, which are used in building network topology, routing and forwarding tables. BIER-enabled nodes, in one embodiment, advertise additional information as well, such as a bit mask size that the BIER-enabled node is configured to use. Adding such BIER information to the advertised information is a relatively small amount of additional information, as compared with the usual topology information exchanged through IGP advertisements, and the state information maintained on a per-group basis in traditional multicast.

Using a mechanism such as IGP advertisements, each BIER-enabled node receives BP-to-router identifier mappings and stores them in a BIRT. Other information can be included in the BIRT, depending on the particular BIER implementation. In an embodiment using an MPLS implementation of BIER, for example, the BIER-enabled node also includes at least one label range in the BIRT for each router ID.

Using the router identifiers, a BIER-enabled node, in an embodiment, performs a recursive lookup in unicast routing tables to identify a directly connected next hop BIER-enabled node (referred to herein as a neighbor) on the shortest path from the BIER-enabled node toward the BIER-enabled node associated with the BP, and the interface via which the neighbor is reachable. In one embodiment, the neighbor is the next hop on a shortest path towards the egress router that originated the advertisement of the bit position. Each BIER-enabled node translates its BIRT(s)

into one or more bit indexed forwarding tables (BIFTs) used for forwarding of BIER messages. A BIFT maps each neighbor node (and/or the egress interface for reaching the neighbor node) to the bit positions of destination nodes reachable via that neighbor node.

BIER Packet Forwarding Example

To illustrate the operation of BIER packet forwarding, network 100 of FIG. 1A is shown again with additional annotation in FIG. 1B. In the embodiment of FIG. 1B, BIER-enabled node 114 (an egress router) signals to BIER-enabled node 106 (an ingress router) that BIER-enabled node 114 is interested in receiving packets associated with a given multicast group or flow. BIER-enabled node 116 likewise signals BIER-enabled node 106 that BIER-enabled node 116 is interested in the same multicast group. In an embodiment, this signaling is done via an "overlay" mechanism not explicitly shown in FIG. 1B, such as an exterior gateway protocol or a control protocol used by a network controller. BIER-enabled node 106 updates an entry in group membership table (GMT) 124 (or creates one if one does not already exist) for the multicast group and updates a packet bit array (PBA) in the entry by setting bits corresponding to BIER-enabled nodes 114 and 116. The bit position 138 for node 116 has a value represented by bit string 0100 having bit 3 of the four bits (counting from the least significant bit at the right) set to 1. Similarly, the bit position assigned to node 114 has a value represented by the bit string 0001 having bit 1 set. Assuming that only BIER-enabled nodes 114 and 116 are interested in the flow, the PBA includes set bits for each of these two bit positions, for an array of {0101}.

In the simplified example of FIG. 1B, the packet bit array and neighbor bit arrays used are four bits long, which is sufficient to represent the three egress routers in network 100, each connected to a respective one of the three receivers in the network. In this example, a "1" value in a bit position of a packet bit array indicates that the corresponding destination node is an intended destination for the packet. An alternative convention for the value at a bit position could be used in another embodiment, but in any case the value of the bit at a bit position in a packet bit array indicates whether the corresponding destination node is an intended destination. In FIG. 1B, icons representing multicast packets, such as original packet 134 and BIER-encapsulated packet 136, are superimposed onto the diagram of network 100. The icons represent snapshots taken at successive times as the packet (or replicas of the packet) moves through the network in the direction of the arrows. At one point in time, for example, packet 136 is moving from node 106 ("A") to node 108 ("B"). At a subsequent point in time, packet 136 has been replicated and forwarded on, so that packet replicas 140 and 142 are moving from node B toward nodes 110 ("C") and 116 ("E"), respectively.

BIER-enabled node (and ingress router) 106 is configured to receive a multicast data packet 134 addressed to the multicast group or flow G1 (e.g., from source 101 via customer edge node 111). In the embodiment of FIG. 1B, BIER-enabled node 106 uses the multicast group address and/or source address included in the multicast data packet to access its GMT 124 and select a packet bit array associated with the multicast group. After selecting a PBA that corresponds to the multicast group from GMT 124, BIER-enabled node 106 encapsulates the packet bit array into the multicast data packet, resulting in BIER packet 136. Ingress node 106 also identifies the neighbors to which packet 136 will be forwarded. In an embodiment, the neighbors are identified using the bit indexed forwarding table (BIFT) of node 106, a portion 126 of which is shown in FIG. 1B. In a further embodiment, this involves performing an AND operation between the packet bit array and each neighbor bit array (NBA) in BIER-enabled node 106's BIFT. In this example, there is only one entry in the BIFT and the entry corresponds to BIER-enabled node 108. This means that the shortest path from BIER-enabled node 106 to all three of the egress routers in network 100 runs through BIER-enabled node 108. Since the result of the AND is TRUE for neighbor B (BIER-enabled node 108), BIER-enabled node 106 forwards the multicast data packet to BIER-enabled node 108. This forwarding may involve other information from the BIFT for node 106 not shown in portion 126, such as egress interface information.

In an embodiment, in response to receiving the multicast data packet, BIER-enabled node 108 performs an AND between the packet bit array in the multicast data packet, {0101}, and the neighbor bit array in each entry in its BIFT (a portion 128 of which is shown). The result for neighbor C is TRUE so BIER-enabled node 108 forwards replica 140 of the multicast data packet to BIER-enabled node 110. In the embodiment of FIG. 1B, BIER-enabled node 108 modifies the packet bit array in the multicast data packet it forwards, as discussed further below. The result for neighbor E is also TRUE, so BIER-enabled node 108 replicates the multicast data packet and forwards replica 142 of the multicast data packet to BIER-enabled node 116, which is an egress router. In the example of FIG. 1B, a "1" value in a bit position of a neighbor bit array indicates that the destination node assigned to the bit position is reachable from the neighboring node corresponding to the forwarding table entry containing the neighbor bit array. An alternative convention for the value at a bit position could be used in another embodiment, but in any case the value of the bit at a bit position in a neighbor bit array indicates whether the corresponding destination node is a reachable destination from the neighbor associated with the neighbor bit array.

In an embodiment, BIER-enabled node 110, in response to receiving a copy of the multicast data packet, performs an AND between the packet bit array in the multicast data packet, {0001}, and the neighbor bit array in each entry in its BIFT (portion 130 of which is shown). The result for neighbor D is TRUE so BIER-enabled node 110 forwards the multicast data packet to BIER-enabled node 114 which is an egress router. The result for neighbor F is FALSE, so BIER-enabled node 110 refrains from forwarding the multicast data packet to BIER-enabled node 118. In this way the multicast data packet travels from the ingress router (BIER-enabled node 106) through the BIER network to the two egress routers that signaled an interest in the multicast group (BIER-enabled nodes 114 and 116).

In the embodiment of FIG. 1B, each time the BIER packet is forwarded using an entry in a bit indexed forwarding table, the packet bit array in the forwarded packet is altered to clear any set bits in bit positions corresponding to nodes not reachable from the neighbor that the packet is being forwarded to. For example, when the multicast packet arrives at node B, it has an incoming packet bit array of {0101}. Comparison of the packet bit array to the neighbor bit arrays shown in BIFT portion 128 shows that the set first (rightmost) bit of the PBA corresponds to a destination node reachable through neighbor C, while the set third bit corresponds to a node reachable through neighbor E. The packet bit array in the packet forwarded to neighbor C accordingly has only the first bit set, and the PBA in the packet forwarded to neighbor E has only the third bit set. This modification of the packet bit array when a BIER packet is forwarded prevents looping and duplication by ensuring that a BIER-enabled node forwards a given multicast data packet only once based on a given bit position. This alteration of the packet bit array to clear bits that are not also set in the neighbor bit array can be interpreted as a form of masking by the neighbor bit array.

In addition to alteration of the packet bit array sent with a forwarded packet (which may also be called a forwarded packet bit array herein), the packet bit array used at a BIER-enabled node for comparison to each neighbor bit array within a BIFT may be modified each time a packet is sent. Specifically, if a packet is sent as a result of comparing the incoming PBA to a neighbor bit array in a bit indexed forwarding table at the node, the PBA used for comparison to the next neighbor bit array in the forwarding table is altered to remove the destinations of the just-sent packet as intended destinations. In one embodiment, this alteration includes performing a bitwise AND operation between the incoming PBA and the inverse of the neighbor bit array corresponding to the neighbor node to which a packet was just sent. This has the effect of clearing those bits corresponding to bit positions which were set in the forwarded PBA of the outgoing packet. This alteration can prevent sending of a duplicate packet in a case for which multiple forwarding table entries have an NBA with the same bit set. This can happen, for example, in equal cost multi-path (ECMP) arrangements.

The above-described modifications to the packet bit array are not needed in embodiments in which the network has a loop-free topology. One example of a loop-free topology is a point-to-multipoint (P2MP) label switched path (LSP) in a network employing multiprotocol label switching (MPLS). Modifications to the packet bit array may also be omitted in embodiments in which some amount of looping and/or duplication can be tolerated.

Bit Array Length

The length of the bit arrays used in a particular BIER network—i.e., the number of bits in the array—can be statically configured or dynamically assigned and distributed through the BIER network. In an embodiment, the length is determined in view of the size and capabilities of the network. One factor affecting the length of a message bit array that can be carried by a message is the type of encapsulation used to include the message bit array in the message.

In some embodiments, existing encapsulations such as Internet Protocol version 6 (IPv6) or Multiprotocol Label Switching (MPLS) can be adapted or extended to carry BIER-related information. For example, a message bit array is written to the destination address field of an IPv6 header in one embodiment. In another embodiment, a message bit array is written to one or more IPv6 extension headers. In an embodiment employing MPLS encapsulation, a message bit array is included in a stack of MPLS labels. In another MPLS embodiment, the message bit array may be encoded outside of the MPLS label structure, between the MPLS label stack and the payload of the message. Although use of existing encapsulations to encode BIER-related information has advantages in terms of leveraging existing network infrastructure, existing encapsulations may impose limitations on the size of a message bit array. In one currently-used MPLS implementation, for example, the message bit array is limited to 256 bits. As another example, one currently-envisioned IPv6 implementation limits the message bit array to approximately 100 bits.

Limitation of the size of a message bit array, whether arising from the message encapsulation used or from other network factors, in turn limits the size of a BIER network, since at least one bit position is needed for each receiver or destination node being addressed. One way that the number of receivers in a BIER network can be increased beyond the network's bit array length is by associating a "set identifier" with the bit array. The receivers to be addressed can be grouped into sets of, say, 256 receivers (or whatever number can be addressed by the bit array). The same bit position can then be used to represent one receiver in, for example, Set 0 and a different receiver in Set 1. In BIER networks employing a set identifier, a message may be sent using multiple message bit arrays, one for each set identifier. In an embodiment, a separate copy of the message is sent for each set identifier/message bit array combination. The bit indexed forwarding tables at each node can include multiple neighbor bit arrays associated with each neighbor, one bit array for each set identifier.

Accommodation of Non-Capable Nodes

The above discussion of BIER network operation is generally in the context of networks in which all nodes between (and including) the ingress node and egress node are BIER-capable (e.g., able to access packet bit arrays and to use bit-indexed forwarding tables). BIER-capable nodes may also be called "BIER-enabled" nodes herein. Because practical networks are often expanded, upgraded and otherwise reconfigured over time, however, capabilities of the nodes and their associated network devices can be inhomogeneous across a network. An upgrade requiring only a software download and install at one node may require replacement of line cards or other hardware at another node. A practical network configured to use BIER for multicast transmission may therefore include some nodes that are not BIER-enabled. In some cases this may occur during a period of migration to BIER forwarding. In other cases, a BIER network may include routers that are incapable of being converted to BIER operation because of hardware restrictions.

Figure 2A:
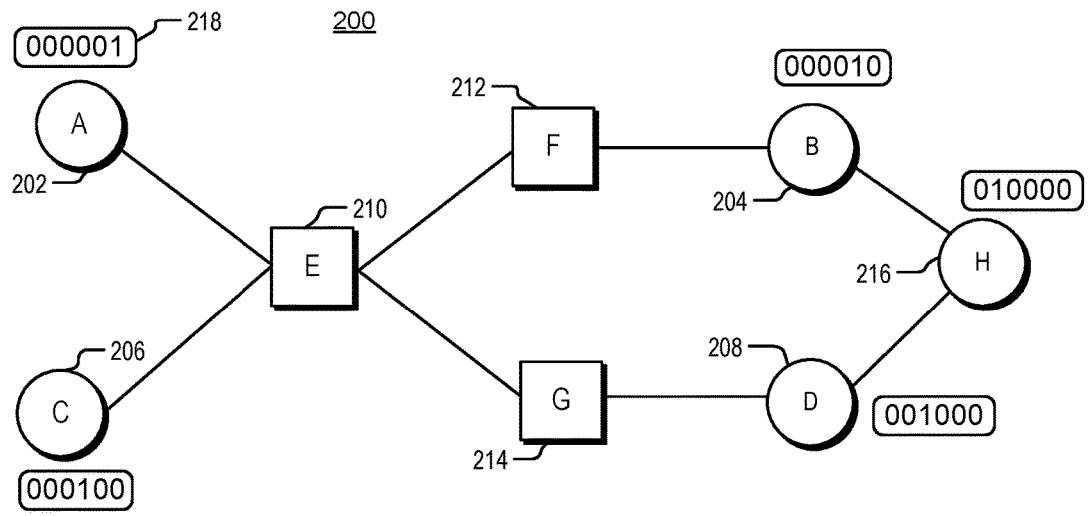
FIG. 2A is a simplified block diagram illustrating certain components of an example network including BIER-capable and non-BIER-capable nodes.

An example of a BIER network including a non-BIER-capable subnetwork is shown in FIG. 2A. Network 200 of FIG. 2A includes BIER-capable routers 202, 204, 206, 208 and 216, having unique identifiers A, B, C, D and H, respectively. These BIER-capable nodes operate in a similar manner as described above for nodes in network 100 of FIGS. 1A and 1B. In the embodiment of FIG. 2A, each of these BIER-capable routers is an egress router assigned a BIER bit position 218. The bit position values are represented using 6-bit bit arrays; the bit positions for nodes A, B, C, D and H are "1", "2", "3", "4" and "5", respectively. Nodes 210 (having unique identifier E), 212 (unique identifier F) and 214 (unique identifier G) of network 200 are not BIER-capable, as represented by the square rather than round shape of the corresponding icons in FIG. 2A. As such, these nodes are not able to use a bit-indexed forwarding table to conduct BIER forwarding.

Some mechanisms for BIER forwarding in the presence of non-BIER-capable nodes are described in U.S. Pat. No. 9,544,230. Among these mechanisms are unicast transmission from the BIER node upstream of the non-capable node to each intended destination node, and unicast tunneling from the upstream BIER node past the non-capable node to a BIER node farther downstream. In networks having a non-capable node at a point in the topology calling for multicast replication, the upstream BIER-capable node employing the mechanisms of U.S. Pat. No. 9,544,230 performs the needed replication itself before sending the resulting unicast packets to the appropriate node downstream from the non-capable node. This upstream replication may cause undesirable loading of the upstream BIER node.

In an alternate approach described herein to traversal of non-BIER-capable subnetworks, the non-BIER-capable subnetwork is configured to send an incoming BIER data message to each of the downstream BIER nodes within a preconfigured tree traversing the non-capable network. The non-BIER-capable nodes do not alter the BIER message bit array carried by the BIER data message, but do replicate the BIER message as needed to deliver it to the destination BIER nodes for the tree. The BIER nodes just downstream of the non-BIER-capable network are configured to modify the message bit arrays of received BIER message replicas using a suitable ingress filter bit mask. The modified message bit arrays properly reflect the BIER egress nodes reachable from, and allocated to, the respective downstream BIER nodes. In this way, the downstream BIER nodes can begin normal BIER forwarding of BIER messages that have traversed the non-BIER-capable subnetwork, even though the non-capable subnetwork delivers replicas carrying the same message bit array to each of the downstream BIER nodes.

Figure 2B:
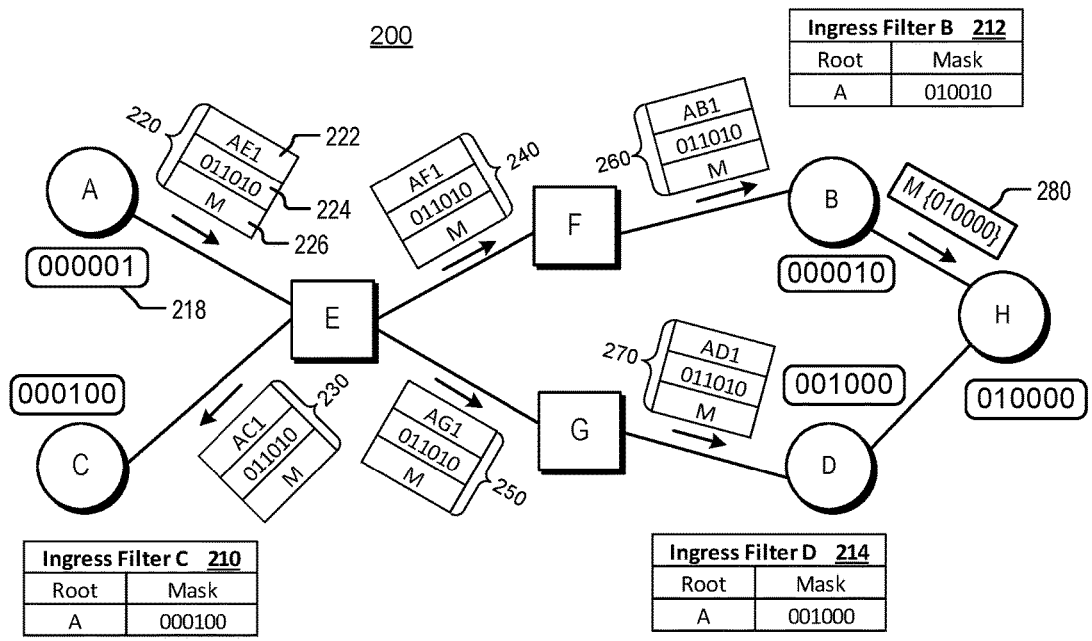
FIG. 2B is a diagram illustrating forwarding of a BIER message through the network of FIG. 2A.

An example of forwarding a BIER data message across the non-BIER capable subnetwork of network 200 is shown in FIG. 2B. Network 200 of FIG. 2A is shown again in FIG. 2B, with some reference characters omitted for clarity. In the embodiment of FIG. 2B, a tree has been established in the form of a point-to-multipoint (P2MP) label-switched path. (Methods of establishing the tree are described below; the forwarding of FIG. 2B is illustrated in the context of a network in which the tree is already established.) The tree is rooted at node A, and traverses the non-BIER-capable subnetwork including nodes E, F and G to reach downstream BIER nodes C, B and D.

In a similar manner to that shown in FIG. 1B above, icons representing messages, such as message 220, are superimposed onto the diagram of network 200, along with arrows to show direction of travel. The icons represent snapshots taken at successive times as the message (or replicas of the message) moves through the network in the direction of the arrows. To begin the illustrated traversal of network 200, upstream BIER node A sends an encapsulated BIER message 220 to non-BIER-capable node E. Encapsulated BIER message 220 is represented as a stack including a forwarding label 222, a BIER message bit array 224, and a message remainder 226. For encapsulated message 220, the value of label 222 is AE1, the value of message bit array 224 is 011010, and identifier M represents the remainder of the BIER data message (including the payload data and other headers and control information not expressly shown). In an embodiment, the combination of message bit array 224 and message remainder 226 represents a BIER-encapsulated message of the form used in a BIER network such as network 100 of FIGS. 1A and 1B, similar to, for example, BIER packet 136 of FIG. 1B. Forwarding label 222 represents the label encapsulation applied by upstream node A for transmission of the BIER message through the non-BIER-capable subnetwork. Label AE1 is a local label allocated to the tree by node E and sent to node A for use in having a BIER message delivered using the tree.

When encapsulated BIER message 220 arrives at node E, it is replicated and forwarded using a label-switching forwarding table and label-based multicast protocols available to the non-BIER-capable node and familiar to one of ordinary skill in the art of network communications in view of this disclosure. Replicas 230, 240 and 250 are sent to downstream nodes C, F and G, respectively. The AE1 label value from the incoming message is swapped for labels AC1, AF1, and AG1 in replicas 230, 240 and 250, respectively. The underlying BIER message, including its message bit array, is unchanged by the forwarding because node E does not have BIER forwarding capability. Labels AC1, AF1 and AG1 were previously allocated to the tree by nodes C, F and G, respectively, and sent to node E.

When BIER node C receives encapsulated BIER message 230, it removes the forwarding label and accesses the BIER message bit array carried by the message. Before attempting BIER forwarding, node C first applies its ingress filter, stored in ingress filter data structure 210, to the message bit array. This prevents duplication of messages which can arise from message replicas having the same message bit array being forwarded to multiple BIER nodes. For the bit convention used in FIG. 2B, a set bit at a bit position in a message bit array indicates that the destination assigned that bit position is an intended destination for the message. A set bit at a bit position in the ingress filter mask stored in data structure 210 indicates that the destination assigned that bit position is reachable via the node storing the ingress filter mask, and designated to that node. In the case of an equal-cost multi-path (ECMP) arrangement, for example, a destination may be equally reachable from more than one node, but designated for just one of the nodes to avoid duplication. Inspection of the ingress filter mask stored in data structure 210 for node C shows that the only destination designated to node C is the node itself (bit position 3). With the bit convention used herein, an ingress filter mask is applied by performing a bitwise AND operation between the filter bit array and the message bit array, with the resulting bit array becoming the new message bit array used for continued BIER forwarding of the message. When the ingress mask of node C is applied to the message bit array of message 230, the resulting message bit array is 000000: no intended destinations for the BIER message are also reachable via, and allocated to, node C. Node C therefore has no additional forwarding to perform and message 230 is dropped.

When non-BIER-capable nodes F and G receive their respective messages forwarded from node E, each node again swaps forwarding labels based on its respective label-switching forwarding table, and forwards its respective message using a new label. Node F forwards message 260 to BIER node B using label AB1 and node G forwards message 270 to BIER node D using label AD1. Label AB1 was previously allocated to the tree by node B and sent to node F, and label AD1 was previously allocated to the tree by node D and sent to node G. Like node C, nodes B and D are the first BIER nodes downstream of the non-BIER-capable subnetwork, along their respective paths within the tree traversing the subnetwork. Nodes B and D therefore remove the forwarding labels encapsulation from their respective received messages, and apply their respective ingress filters to the message bit array of the incoming message.

Inspection of the ingress filter mask stored for node B in ingress filter data structure 212 shows that nodes B (bit position 2) and H (bit position 5) are destinations allocated to node B. Applying this ingress mask to the message bit array of message 260 results in a modified message bit array of 010010. This modified message bit array is then used in a BIER forwarding process at node B. Because one of the intended destinations of the message is node B itself, a replica of the message is decapsulated (has its BIER encapsulation removed) and sent to the appropriate host by the network protocol(s) in use outside of BIER network 200, a process not expressly shown in FIG. 2B. The BIER forwarding process at node B also results in replica BIER message 280 being sent to node H (bit position 5). In the embodiment of FIG. 2B, the BIER forwarding process modifies the message bit array of message 280 in a way discussed above in connection with FIG. 1B, so that the bit in bit position 2 is reset.

For BIER node D, the ingress filter mask stored in ingress filter data structure 214 shows that the only destination allocated to node D is node D itself (bit position 4). Although node H is equally reachable via nodes G and D as it is via nodes F and B, node H was allocated in this implementation to the path through node B. Applying the ingress mask at node D to the message bit array results in a modified message bit array of 001000. Because bit position 4 is local to node D, the BIER message is decapsulated and passed to the appropriate host outside of BIER network 200.

The result of the message propagation illustrated in FIG. 2B is that the original BIER packet sent by node A was delivered to its intended destinations—nodes B (bit position 2), D (bit position 4) and H (bit position 5)—without message duplication, and without BIER forwarding capability in the subnetwork formed by nodes E, F and G. This results from a combination of (1) replication and delivery of the original message throughout a predetermined tree traversing the non-BIER-capable network and (2) ingress filtering at the downstream BIER nodes to prevent duplication. In the embodiment of FIG. 2B, downstream BIER nodes C, B and D are all egress nodes having assigned bit positions, but in other embodiments some or all of the downstream BIER-capable nodes do not have assigned bit positions. The ingress filter data structures embodiments of FIG. 2B associate the ingress filter bit array with the root node of the tree. In other embodiments, the filter bit array is associated with some other quantity associated with a tree, such as the local label allocated to a tree. Multiple different trees can be established for use in traversing a non-BIER-capable subnetwork, including multiple trees sourced from the same root node. A tree can be established that allows connection to all BIER destination nodes reachable via the non-BIER-capable nodes in the subnetwork, or can allow connection to a subset of the destination nodes.

The forwarding example discussed above is enabled by the preconfigured tree rooted at upstream BIER node A, as well as forwarding labels and ingress filter bit masks associated with the tree. The discussion that follows describes methods of configuring such trees, labels and ingress masks. The configuration methods described herein employ two approaches. One approach is to enlist the non-BIER-capable routers in establishing paths through the non-BIER-capable subnetwork toward the BIER egress nodes that are to be accessed using a tree. This approach can be employed with non-BIER-capable routers which, though lacking BIER data-plane capability, have BIER control-plane capability. Such routers can be programmed (through a software upgrade, for example) to recognize advertised associations between router identifiers and BIER bit positions, and generate bit indexed routing tables, even when they lack the hardware required to perform BIER forwarding. The other approach is to generate, in the upstream BIER router sourcing the tree, explicit paths which combine to form the tree, along with the ingress filter bit arrays needed at each of the downstream BIER routers. This traffic-engineered approach can be used to traverse a subnetwork of routers having no BIER capability at all, in the control plane or the data plane.

Beginning with the approach employing routers with control-plane BIER capability, examples of bit indexed routing tables for nodes of network 200 are shown in FIGS. 3A through 3G. These example tables include the most fundamental information for a bit indexed routing table: bit positions of reachable egress nodes, router identifiers corresponding to the bit positions, and identifiers of neighbor nodes via which the egress routers are reachable (typically calculated using a shortest-path-first algorithm). Embodiments of bit indexed routing tables also include other information not shown in these examples, such as egress interface identifiers, or remote and local labels used in an implementation employing an MPLS BIER encapsulation. In a network configured with trees as disclosed herein for traversing non-BIER capable subnetworks, bit indexed routing tables may also include tree identifiers and associated forwarding labels. Table 300 of FIG. 3A is an example of a bit indexed routing table for BIER-capable node A of network 200. It maps bit positions 2, 3, 4 and 5 (all bit positions in the network other than the one assigned to node A itself) to corresponding egress router identifiers B, C, D and H, respectively. Table 300 also identifies node E as the neighbor via which all of the egress routers are reachable from node A. Table 320 of FIG. 3B is an example of a bit indexed routing table for BIER-capable node B. Accordingly, table 320 maps bit positions 1, 3, 4 and 5 to their respective router identifiers. Egress nodes A, C and D are identified as reachable from node B via neighbor F, while node H is a next-hop node to node B. Bit indexed routing table examples 330 for BIER-enabled node C and 340 for BIER-enabled node D are shown in FIGS. 3C and 3D.

For non-BIER-capable nodes E, F and G, bit indexed routing table examples 350, 360 and 370 reflect embodiments in which nodes E, F and G have control-plane BIER capability. The tables of FIGS. 3E, 3F and 3G accordingly map the five assigned bit positions in the network to their corresponding egress router identifiers, and identify the neighbor node for reaching each of the egress routers. In the case of table 350 at node E, bit position 5 for egress router H is mapped to two neighbor nodes, F and G. This reflects the two equal-cost paths to node H from node E: one via node F and the other via node G. In an embodiment, one of the equal-cost paths is chosen during the tree configuration process employing routing table 350, as discussed further below in connection with FIG. 4B.

Bit indexed routing tables like those of FIGS. 3A through 3G are used in carrying out a tree configuration process disclosed herein. An embodiment of such a configuration process is illustrated in FIGS. 4A through 4D. To help illustrate the sequencing of this embodiment of the process, successive stages of the process are shown in separate drawings. In the embodiment of FIGS. 4A through 4D, an interaction between nodes A and E (illustrated in FIG. 4A) is followed by interactions between node E and each of nodes C, F and G (illustrated in FIG. 4B), which is in turn followed by interactions between nodes F and B and nodes G and D (shown in FIG. 4C).

Figure 4A:
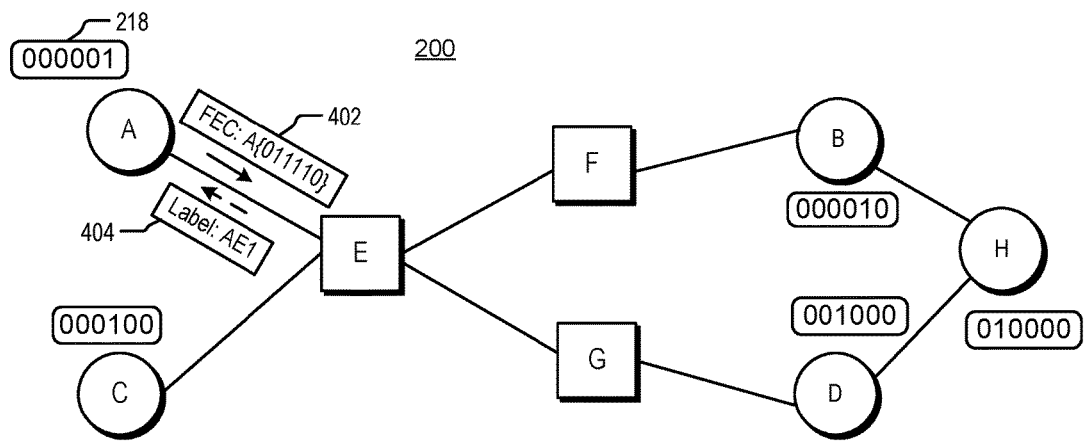
FIGS. 4A through 4D illustrate successive stages of an embodiment of a tree configuration process in an embodiment of the network of FIG. 2A.

FIG. 4A depicts network 200 of FIGS. 2A and 2B, in an embodiment for which non-BIER-capable nodes E, F and G (i.e., nodes without data-plane BIER capability) have control-plane BIER capability. In the embodiment of FIG. 4A, a tree sourced at BIER-capable node A is to be configured using a process initiated at node A. Node A determines which BIER egress nodes are to be accessed using the tree, and which of those egress nodes are reachable via a given next-hop non-BIER-capable node. A tree descriptor packet is then sent to the downstream node, node E in the embodiment of network 200. Tree descriptor packet (or message) 402 identifies a forwarding equivalence class (FEC) for the tree being established: a tree rooted at node A and including paths toward egress nodes with bit positions 2, 3, 4 and 5. The FEC is an embodiment of an identifier for the tree. A tree identifier in some form is included in the descriptor message so that the non-BIER-capable nodes can allocate labels to the tree for use in message forwarding once the tree is established. The bit positions of the BIER egress nodes to be reached via the tree are encoded in a descriptor bit array carried by the tree descriptor message. In response to receiving the descriptor message, node E allocates a local label 404, having a value AE1, to the tree and sends that label back to node A (the responsive nature of the label transfer indicated using a dashed-line arrow). In an embodiment, the local label could also be flooded throughout the network or domain. Node A stores label AE1 in its forwarding and routing tables and, once the tree is established, uses the label to encapsulate BIER data messages for forwarding across the non-BIER-capable subnetwork, as shown in FIG. 2B above.

The descriptor message can be implemented using various existing protocols, or with extensions to such protocols. For example, extensions of a BGP, an IGP, Multicast Label Distribution Protocol (mLDP) or the Resource Reservation Protocol for Traffic Engineering (RSVP-TE) can be used. Implementation of the descriptor messages and label exchanges described herein using various protocols or extensions thereof will be apparent to one of ordinary skill in the art in view of this disclosure. In an alternative embodiment, a new protocol for implementing the tree configuration methods described herein can be developed. In an embodiment, a label request is included in the descriptor message. In an alternative embodiment, a node receiving a descriptor message is programmed to automatically allocate a label to the tree identified by the descriptor message and send the label back to the sender of the descriptor message. A descriptor message as disclosed herein includes, in an embodiment, an indicator to the receiving node of its status as a descriptor message. In an embodiment, a forwarding label value chosen from a designated range of label values serves as such an indicator. Alternatively or in addition, a different indicator such as a designated field or flag may be used.

Figure 4B:
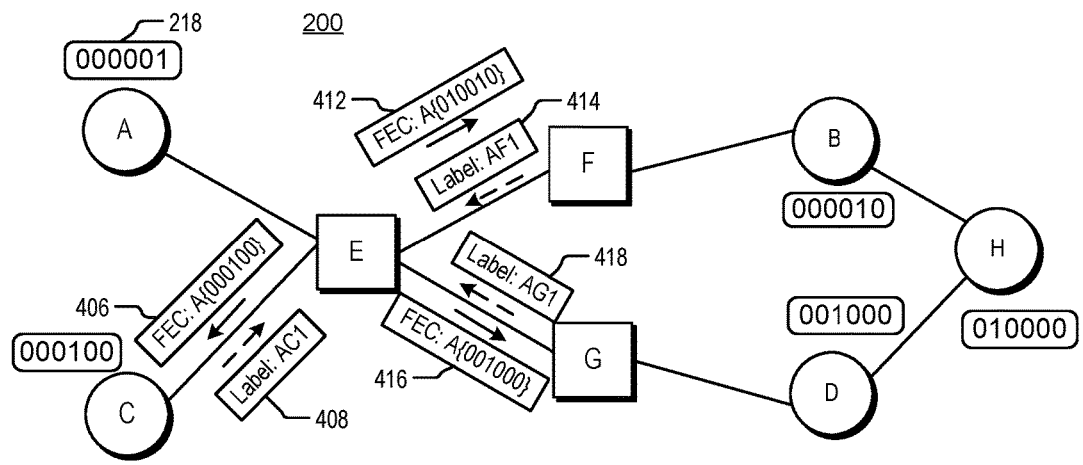

A second stage of the tree configuration method is illustrated in FIG. 4B. After receiving descriptor message 402, node E accesses the descriptor bit array in the message, and uses its bit indexed routing table to determine which of the intended destinations identified in the descriptor bit array should be accessed from which of node E's downstream neighbor nodes. As shown in routing table 350 of FIG. 3C, bit position 3 (for node C) is accessed via node C. Node E generates a new tree descriptor message 406, including a new descriptor bit array indicating only node C as a destination, and sends the descriptor message to node C. Descriptor message 406 identifies its associated FEC as a branch, leading to node C (bit position 3), of the tree sourced at node A. Node C allocates a local label 408 to the tree and sends the label back to node E. Node E stores the received label in its forwarding and routing tables for use in forwarding future encapsulated BIER data messages. Because node C is the first downstream BIER node along its leg of the tree, propagation of descriptor messages along that leg ends at node C. Instead, node C stores the descriptor bit array from descriptor message 406 in its ingress filter data structure 410 as an ingress filter bit mask. In the embodiment of FIG. 4B, the ingress filter bit mask is stored in association with the local label node C allocates for the tree associated with the received descriptor message.

In generating new descriptor messages for sending to nodes F and G, node E encounters in its forwarding table 350 the ECMP choices of node F or node G for allocation of the bit position for egress node H. In an embodiment, node E applies one or more criteria for selection between the ECMP neighbors. Such criteria may, in a further embodiment, involve a value carried by the descriptor packet, such as an entropy value, or a hash of such a value. Alternatively or in addition, such criteria may involve load balancing considerations in view of other trees established in the network. Node E may, in another embodiment, apply a simple rule such as always selecting the first neighbor listed in the routing table. In the embodiment of FIG. 4B, bit position 5 for node H is allocated to neighbor F, as reflected in the descriptor bit array of descriptor message 412 sent to F. Node F in turn allocates a local label 414 to the tree and sends the label back to node E. In a similar manner as for nodes C and F, node E creates descriptor message 416, including a descriptor bit array identifying only node D as a destination, and sends the message to node D. Node D allocates local label 418, having value AG1, to the tree and sends the label back to node E. It is noted that non-BIER-capable node E performs the same process—determining egress nodes, creating a new descriptor message, sending the message to a downstream node, and receiving and storing a label from the downstream node—whether the downstream node is BIER-capable or non-BIER-capable.

Figure 4C:
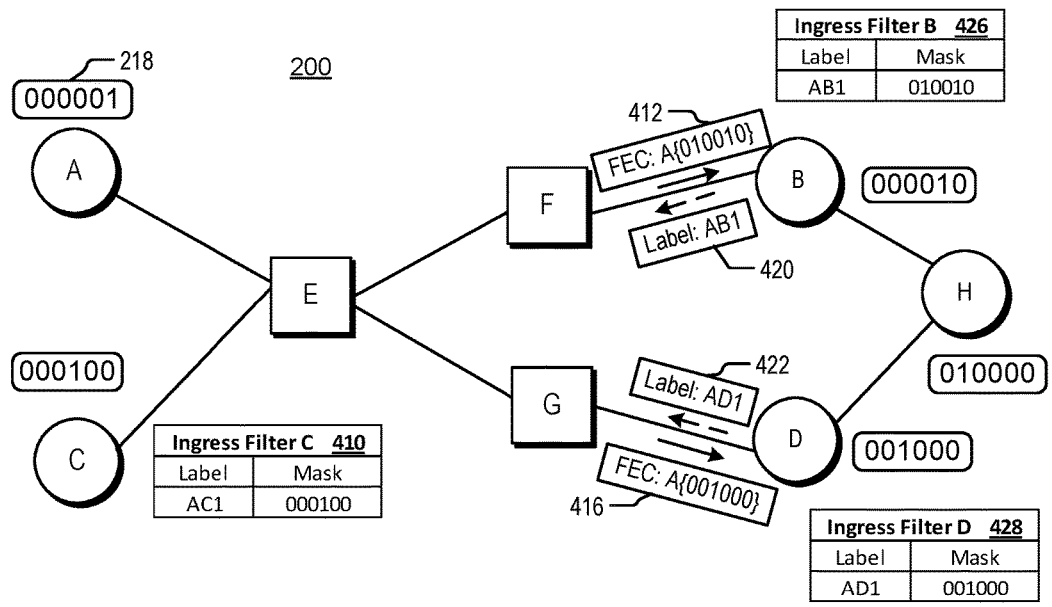

A third stage of the tree configuration method is illustrated in FIG. 4C. In general, non-BIER-capable nodes F and G operate in a similar manner to node E described above. Because network 200 does not branch at either of these nodes, the tree descriptor messages sent to node B (by node F) and to node D (by node G) have unchanged descriptor bit arrays from those in the descriptor messages received by nodes F and G, respectively. Bier-capable nodes B and D operate in a similar manner to BIER-capable node C described above. Node B allocates a local label 420 to the tree and sends the label back to node F, while node D allocates a local label 422 to the tree and sends the label back to node G. Nodes F and G store their respective received labels in the appropriate forwarding and routing tables for later use forwarding encapsulated BIER data messages. In addition, node B stores the descriptor bit array from received descriptor message 412 in its ingress filter data structure 426 as an ingress filter bit mask. The ingress filter bit mask is stored in association with the local label AB1 allocated by node B for the tree. Similarly, node D stores the descriptor bit array from received descriptor message 416 in its ingress filter data structure 428 as an ingress filter bit mask. The ingress filter bit mask is stored in association with the local label AD1 allocated by node D for the tree. When each generated tree descriptor message has reached a first downstream BIER-capable node, an ingress filter bit mask has been stored at each of the first downstream BIER-capable nodes, and local labels have been allocated, sent and stored in response to each tree descriptor message, the configuration procedure is complete.

Figure 4D:
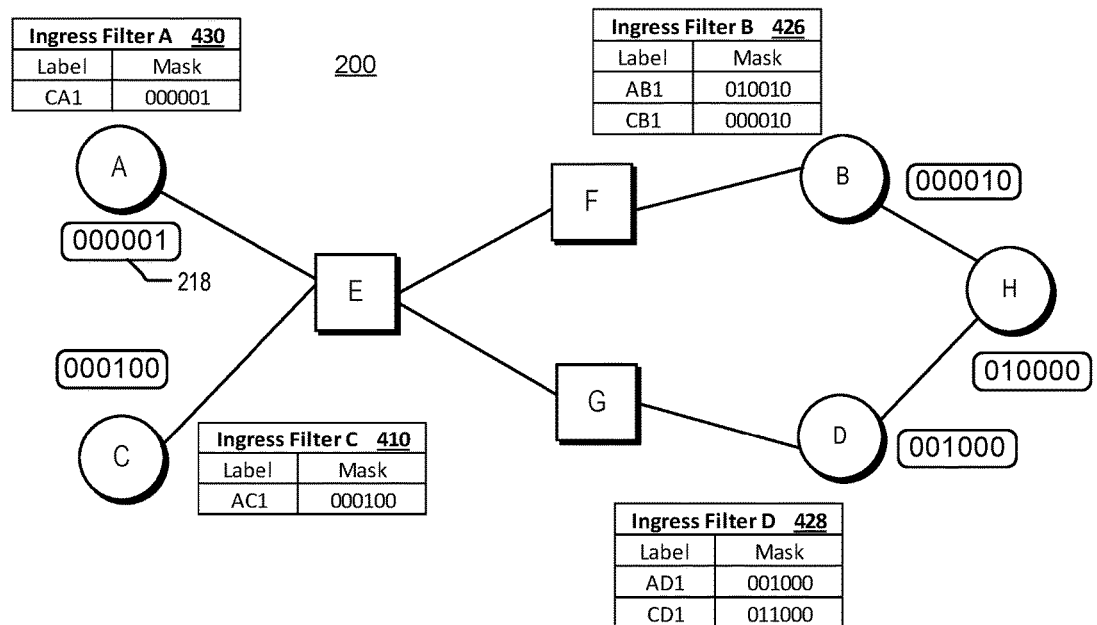

FIG. 4D illustrates an embodiment of an ingress filter configuration for network 200 at a subsequent time after a second tree configuration process has been performed. In the embodiment of FIG. 4D, the second tree configuration process is for a tree sourced at node C. Ingress filter data structures 426 and 428, for nodes B and D, respectively, each include two entries: one for a tree sourced at node A and another for a tree sourced at node C. In addition, ingress filter data structure 430 is stored at node A and includes an ingress filter mask for a tree sourced at node C.

In the tree configuration process described in connection with FIGS. 4A through 4D above, a descriptor bit array identifying reachable BIER egress nodes to be accessed by a desired tree is used in conjunction with bit indexed routing tables to allow nodes having BIER control plane capability to participate in building of the tree. The descriptor bit array is modified as the tree is built until arriving at a first downstream BIER-capable node, whereupon the descriptor bit array defines the ingress mask to be used at the downstream BIER-capable node. In an embodiment, use of bit indexed routing tables to generate the tree causes the paths followed by data messages forwarded using the tree to be identical to paths the data messages would follow if forwarded using BIER-capable routers. An advantage of using bit indexed routing tables in generating the tree is that the routing tables are updated automatically in the event of topology changes. In an embodiment, the nodes within a configured tree are programmed to send new tree descriptors and exchange new forwarding labels in the event of routing table updates.

Examples of forwarding tables for selected nodes within network 200 are shown in FIGS. 5A through 5F. The example forwarding tables reflect the configuration of network 200 after completion of the configuration process illustrated in FIGS. 4A through 4C. Forwarding tables such as those of FIGS. 5A through 5F are used for forwarding of a BIER data message through network 200, in a similar manner to that discussed above in connection with FIG. 2B. Table 500 of FIG. 5A is an example of a forwarding table for node A of network 200. As a BIER node directly upstream from a non-BIER-capable subnetwork, node A has a kind of hybrid forwarding table combining bit indexed lookup for incoming BIER messages with label-switching-based forwarding into the non-BIER-capable network. Forwarding table 500 includes a bit position column, a column for the neighbor via which each egress router can be reached, a neighbor bit array (NBA) column identifying bit positions of routers reachable from that neighbor, an FEC column for identification of trees bridging the non-BIER-capable subnetwork which can be used to reach a given router, a stack instruction column ("Inst."), and a remote label ("RL") column.

In the embodiment of table 500, identifier A for the root node of the tree is used as the tree identifier in the FEC column. In some embodiments, more than one tree is available to reach a given egress router. In such an embodiment, separate forwarding tables are used for each tree, because the remote label applied to encapsulate the BIER packet for sending into the non-BIER-capable subnetwork is associated with the tree. Alternatively, separate forwarding tables can be established, one for each tree. The stack instruction column includes a decapsulate ("decaps") instruction for bit position 1, since that bit position is local to node A so that the BIER encapsulation is to be removed. The instruction for the remaining bit positions is "push," so that remote label AE1 is added to any existing label structure used to implement the BIER encapsulation.

Table 510 of FIG. 5B is an example of a forwarding table for non-BIER-capable node E of network 200. Because node E does not have BIER forwarding (data plane) capability, table 510 is a label-switching-based forwarding table. Forwarding table 510 includes an incoming local label ("LL") column, a column for the neighbor to which a message is to be forwarded, a stack instruction column, and a remote label column. For each replica message being sent to one of neighbors C, F or G, table 510 instructs that incoming label AE1 is to be swapped with the outgoing remote label corresponding to the neighbor. Table 510 includes labels allocated to the tree configured by the process shown in FIGS. 4A through 4C. In embodiments for which a network has multiple trees defined, forwarding table 510 could include an FEC or tree identifier column in some embodiments. Alternatively, a separate forwarding table could be designated for use with each tree.

Table 520 of FIG. 5C is an example of a forwarding table for non-BIER-capable node F of network 200. Table 530 of FIG. 5 is an example of a forwarding table for non-BIER-capable node G of network 200. Tables 520 and 530 are similar to table 510 of FIG. 5B, such that the explanations and considerations given above for table 510 apply to tables 520 and 530 as well.

Table 540 of FIG. 5E is an example of a forwarding table for downstream BIER-capable node B. Because node B is a BIER-capable node at which normal BIER forwarding commences after BIER messages have traversed the non-BIER-capable subnetwork, table 540 is a bit indexed forwarding table similar to those shown in FIG. 1B above. However, BIER forwarding using a table such as table 540 does not commence until the ingress filter bit array stored at node B is first applied to the message bit array of an incoming BIER message, as discussed above in connection with FIGS. 4B and 4C. Table 540 includes columns for bit position of reachable egress routers, neighbor via which an egress router having a given bit position can be reached, and neighbor bit array ("NBA") identifying the bit positions of routers reachable via that neighbor. Table 550 of FIG. 5F is an example of a forwarding table for downstream BIER-capable node D. Table 550 is similar to table 540 of FIG. 5E, such that the explanations and considerations given above for table 540 also apply to table 550.

The tables of FIGS. 5A through 5F, along with those in FIGS. 3A through 3G and any other tables described herein, are intended to illustrate certain kinds of data being provided without limiting the format or arrangement of such data. For example, values shown subtending multiple rows of certain tables, such as bit position or router ID values in table 350 of FIG. 3E, may be implemented as multiple instances of each value, one in each row. As another example, bit positions of reachable receivers in a forwarding table such as table 500 may in some embodiments be encoded as one or more separate bit position numbers rather than with bit values in a bit array. Tables as described herein may have data arranged in multiple different ways, and may take the form of a database or some other data structure. For example, tables sorted by bit position such as the routing tables of FIGS. 3A through 3G may in other embodiments by sorted by neighbor node, with neighbor bit arrays to indicate which bit positions are reachable from each neighbor. Multiple tables for a single node may in an alternative embodiment take the form of portions of a single table. Single tables described herein may in alternate embodiments be split into more than one data structure. "Table" as used herein may refer to a relevant portion of a table or other data structure, or to a collection of multiple tables or data structures holding related data. Embodiments of the tables described herein may also include other data not expressly shown, such as interface information or other information that may typically be stored at network nodes.

As noted above, this disclosure describes two approaches for configuration of trees to traverse a non-BIER-capable subnetwork. The first approach, in which the non-BIERcapable routers have BIER control-plane capability, is discussed in connection with FIGS. 4A through 4C above. We now turn to the second approach, in which the non-BIER-capable routers do not need to have any BIER capability at all, in the control plane or the data plane. Because paths to egress routers are not determined by these routers having no bit indexed routing tables, the tree paths are instead determined at the upstream BIER node and provided to the non-BIER-capable nodes using one or more explicit route objects (EROs). In addition, ingress filter bit arrays cannot be generated through modification of the descriptor bit array. Instead, the ingress filter bit array needed by each downstream BIER-capable router is determined in advance at the upstream BIER node and carried unchanged through the non-BIER-capable subnetwork until delivered to the appropriate downstream BIER node.

Figure 6A:
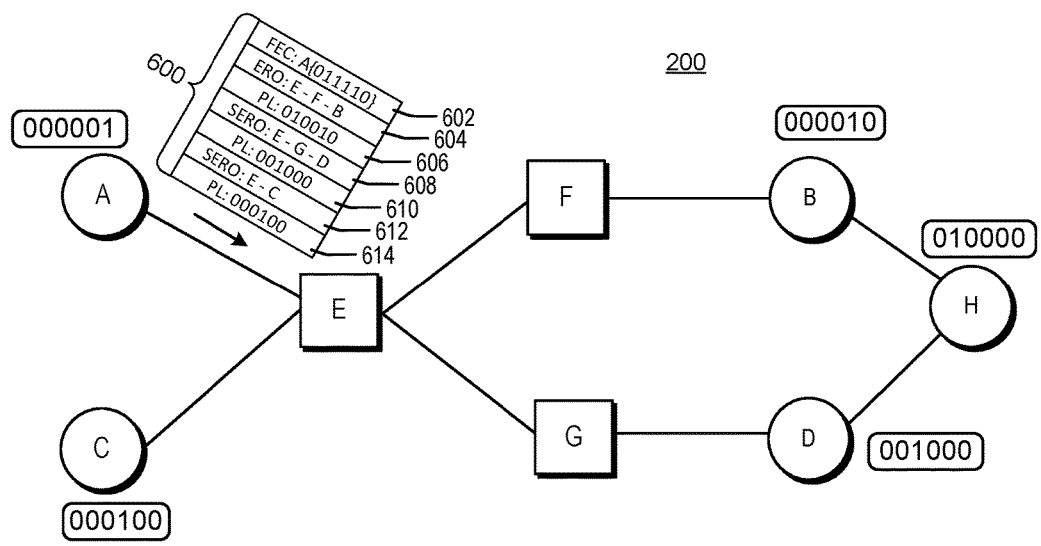
FIGS. 6A through 6D illustrate successive stages of another embodiment of a tree configuration process in an embodiment of the network of FIG. 2A.

An embodiment of a tree configuration process which requires no BIER capability at all from routers in the non-BIER-capable subnetwork is illustrated by FIGS. 6A through 6D. In a similar manner to that of FIGS. 4A through 4D, successive stages of the process are shown in separate drawings. An initial operation by upstream BIER node A is illustrated in FIG. 6A. In the embodiment of FIG. 6A the tree to be configured is the same tree sourced at node A configured in the process of FIGS. 4A through 4C. Node A determines which BIER egress nodes are to be accessed using the tree. In addition, node A determines the explicit paths to be followed within the tree, which nodes are the first downstream BIER-enabled nodes encountered on each path within the tree, and what ingress filter bit arrays will be needed at each of these downstream BIER-enabled nodes. A tree descriptor message is then sent to the next-hop downstream non-BIER-capable node. In an embodiment, descriptor message 600 sent from node A to non-BIER-capable node E is a point-to-multipoint (P2MP) RSVP-TE Path message. The message is illustrated conceptually as a stack in FIG. 6A in order to highlight certain components. A Path message includes other components not shown in message 600. Tree identifier 602 is represented as an FEC for the tree sourced at node A and including paths toward egress nodes with assigned BIER bit positions of 2, 3, 4 and 5. The FEC is an embodiment of an identifier for the tree. In an embodiment, tree identifier 602 is in the form of a different identifier for the tree, such as a P2MP identifier in the P2MP RSVP-TE protocol.

Descriptor message 600 also includes an explicit route object (ERO) 604, defining a path from node E to node F to node B. In the embodiment of FIG. 6A, descriptor message 600 also includes a secondary explicit route object (SERO) 608, defining a path from node E to node G to node D, and another secondary explicit route object 612, defining a path from node E to node C. In an embodiment, an ERO and one or more SEROs may be included in a single P2MP RSVP-TE Path message to define a tree. In another embodiment, a tree descriptor message sent to node E comprises a collection of multiple Path messages, each including a tree identifier 602 for the overall tree, and each including an ERO for a single path within the tree.

ERO 604 is associated with a "payload" (PL) object 606, where "payload" is used here as information that is carried and delivered without being accessed or acted upon by nodes within the non-BIER-capable subnetwork. In an embodiment, payload object 606 is in the form of an "unknown-class" object within the RSVP protocol. In a further embodiment, the unknown-class object has a class number octet of 11bbbbbb. Such an object is forwarded unexamined and unmodified by the RSVP protocol. The payload carried by payload object 606 is a descriptor bit array having bit values 010010. This bit array matches the ingress filtering bit array to be stored by downstream BIER-capable node B. By contrast to the descriptor bit array of FIGS. 4A through 4C, the descriptor bit array of FIG. 6A is not altered by non-BIER-capable nodes as it travels. Instead, the descriptor bit array in object 606 is delivered intact to node B after explicit route E-F-B is traversed.

In a similar manner to that described above for ERO 604 and payload object 606, SERO 608 is associated with a payload object 610. Payload object 610 carries a descriptor bit array having bit values 001000. This bit array matches the ingress filtering bit array to be stored by downstream BIER-capable node D. Similarly, SERO 612 is associated with a payload object 614. Payload object 614 carries a descriptor bit array having bit values 000100. This bit array matches the ingress filtering bit array to be stored by downstream BIER-capable node C.

Figure 6B:
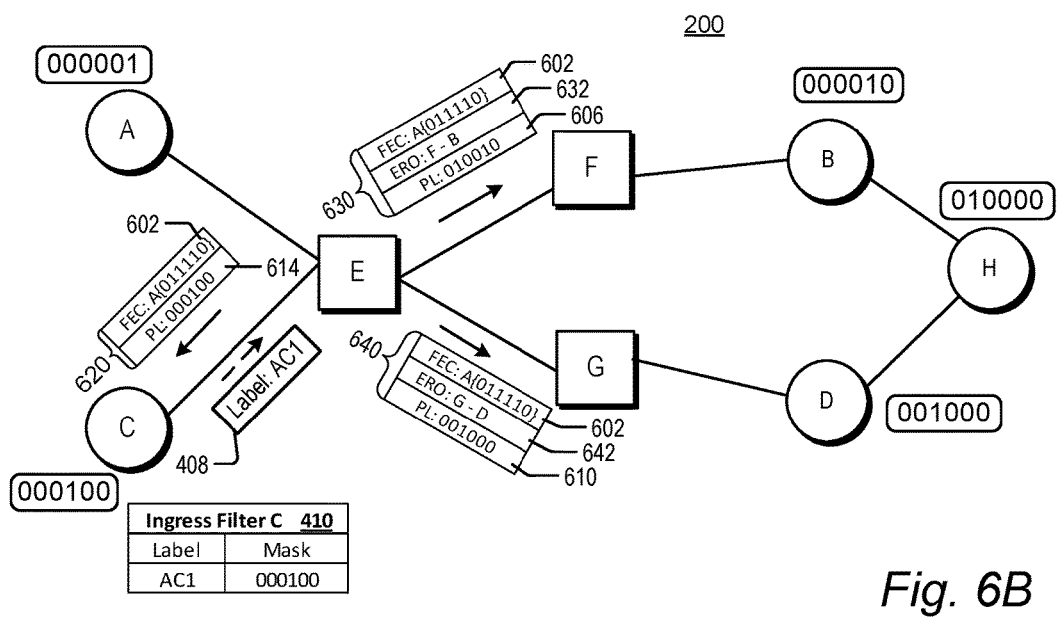

A second stage of the tree configuration method is illustrated in FIG. 6B. After receiving descriptor message 602, node E accesses the ERO and SERO objects. New descriptor messages are sent from node E along each of the three paths encoded by the ERO and SERO objects. In an embodiment, the new descriptor messages are in the form of new Path messages. Each of the new descriptor messages includes the tree identifier and the appropriate unaltered descriptor bit array. For example, tree descriptor message 620 including tree identifier 602 and payload object 614 is sent to node C, which is the end of the explicit path encoded by SERO 612. As the end of the path, node C allocates a label 408 to the tree and sends it back to node E. In an embodiment, the label is sent using a Resv message within the RSVP protocol. Node C also accesses the descriptor bit array in payload object 614 and stores it in its ingress filter data structure 410.

In descriptor message 630 sent to node F, node E includes a new ERO object 632 encoding the remaining portion of the original path to node B, along with tree identifier 602 and payload object 606. In descriptor message 640 sent to node G, node E includes a new ERO object 642 encoding the remaining portion of the original path to node D, along with tree identifier 602 and payload object 610.

Figure 6C:
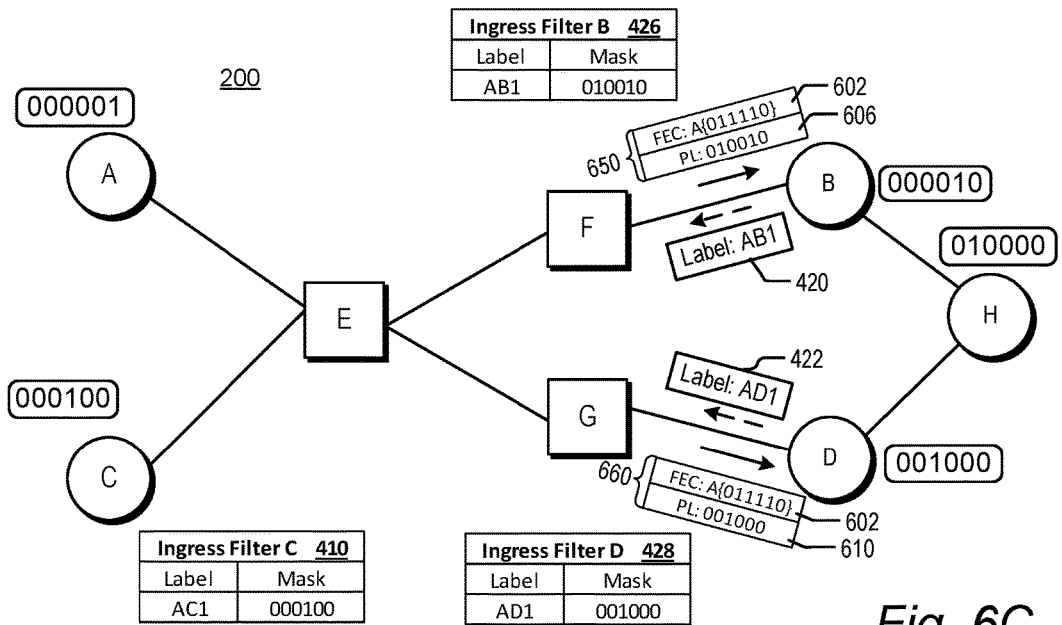

A third stage of the tree configuration method is illustrated in FIG. 6C. Descriptor message 650 sent by node F to node B is similar to message 620 sent to node C in FIG. 6B. As the end of the explicit path originally encoded by ERO 604, node B allocates a label 420 to the tree and sends it back to node F. Node B also accesses the descriptor bit array in payload object 606 and stores it in its ingress filter data structure 426. Similarly, node D, upon receiving descriptor message 660 from node G, allocates a label 422 to the tree and sends the label back to node G. Node D also accesses the descriptor bit array in payload object 610 and stores it in its ingress filter data structure 428.

Figure 6D:
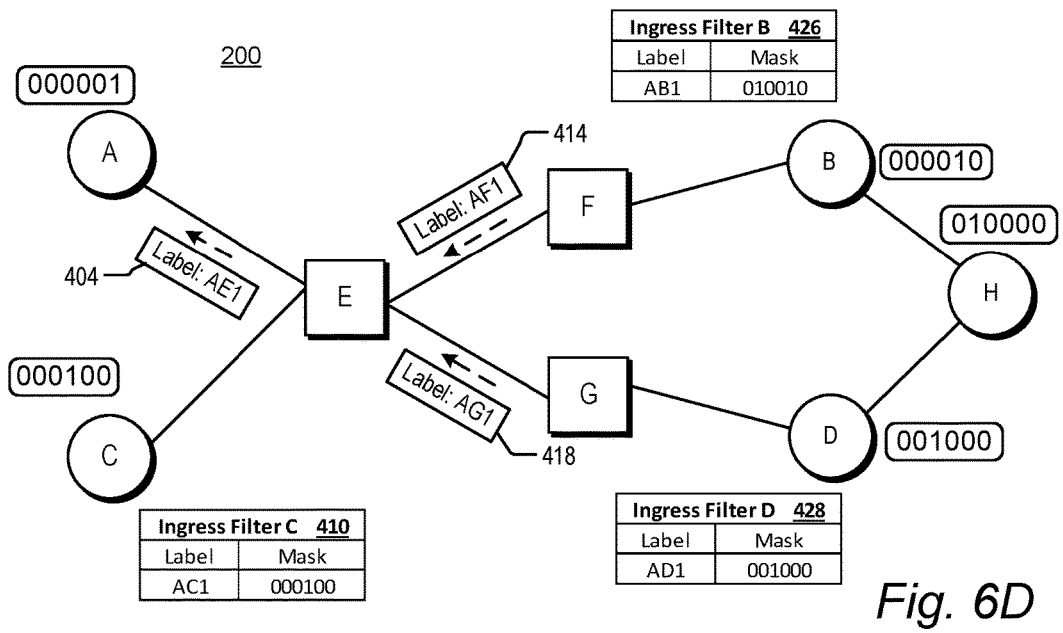

Subsequent stages of the tree configuration method are illustrated in FIG. 6D. Upon receiving labels 420 and 422 from nodes B and D, respectively, nodes F and G allocate labels 414 and 418, respectively, to the tree and send those labels back to node E. When node E has received labels 408, 414 and 418 from nodes C, F and G respectively, node E allocates label 404 to the tree and sends the label back to node A. At this point the tree structure, labels and ingress filters are configured in the same manner as that of FIG. 4C, but the configuration was done using a different method. In an embodiment, one or more protocols other than P2MP RSVP-TE are used to send generate and send the descriptor messages. For example, a type-length-value (TLV) data structure in mLDP may be used to deliver the ingress filter bitmasks in some embodiments. In an embodiment, some or all of the determinations made by an ingress node for the configuration methods described herein are made by a network controller instead. In a further embodiment, additional configuration tasks, such as BIER bit position assignment or population of forwarding tables, are also performed by a network controller.

Figure 7A:
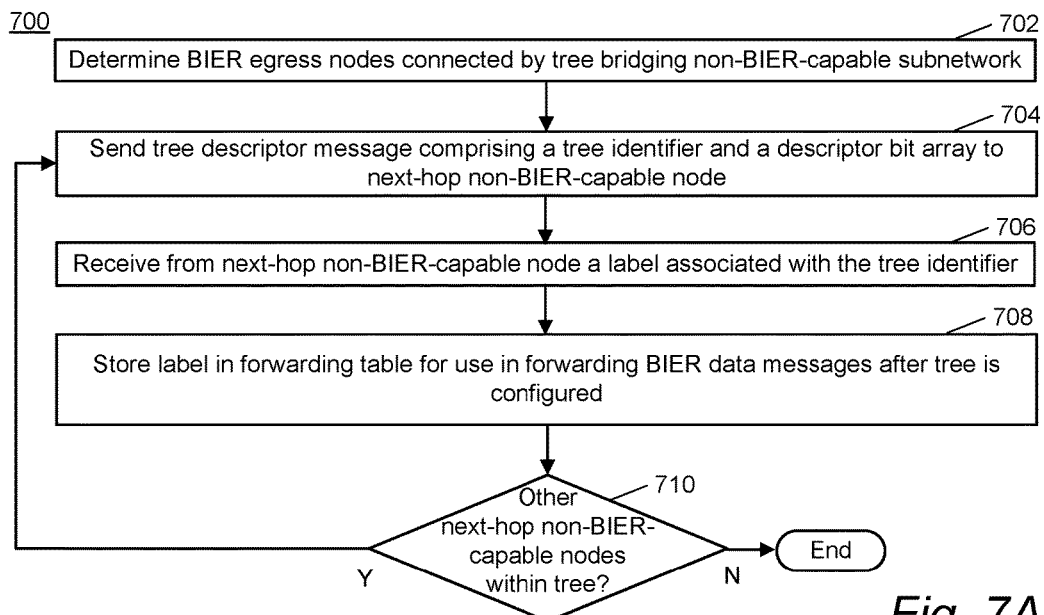
FIG. 7A is a flow chart illustrating an embodiment of a configuration method performed at a BIER-capable node just upstream of a non-BIER-capable subnetwork as described herein.

An embodiment of a configuration method which may be performed at an upstream BIER-capable node, such as node A of network 200, is illustrated by the flowchart of FIG. 7A. Method 700 begins at step 702 with determining the BIER egress nodes to be connected by a tree bridging a non-BIER-capable subnetwork. The node performing method 700 sends a tree descriptor message comprising a tree identifier and a descriptor bit array to a next-hop non-BIER-capable node (step 704). A label associated with the tree identifier is received from the next-hop non-BIER-capable node (step 706). The received label is stored in a forwarding table for use in forwarding BIER data messages once the tree configuration is complete (step 708). If there are additional next-hop non-BIER capable nodes within the planned tree (for example, nodes needed for accessing some of the BIER egress nodes to be connected by the tree), the steps of sending a tree descriptor message, receiving a label and storing the label are repeated for the next non-BIER-capable node. The non-BIER-capable subnetwork of example network 200 discussed herein was completely accessible via node E, but in some network topologies tree descriptors may need to be sent to multiple non-BIER-capable nodes to complete tree generation.

Figure 7B:
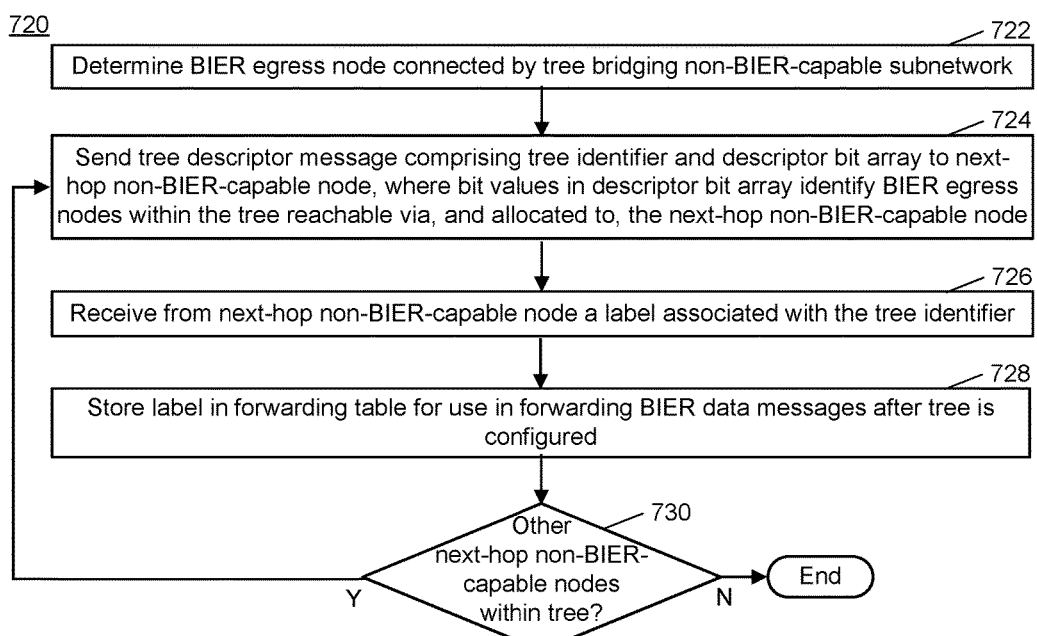
FIG. 7B is a flow chart illustrating an embodiment of a variation of the method of FIG. 7A.

The flowchart of FIG. 7B illustrates a variation of the method of FIG. 7A which may be used with non-BIER-capable nodes having BIER control-plane capability. Method 720 begins, like method 700, with determining the BIER egress nodes connected by the intended tree (step 722). As noted in step 724 of method 720, method 720 differs from method 700 in that the bit values in the descriptor bit array within the sent tree descriptor message identify BIER egress nodes within the tree that are reachable via, and allocated to, the next-hop non-BIER-capable node that the tree descriptor message is sent to. Method 720 continues in a similar manner to method 700, with receiving a label from the next-hop node (step 726), storing the label in a forwarding table (step 728), and checking for other next-hop non-BIER-capable nodes (decision step 730).

Figure 7C:
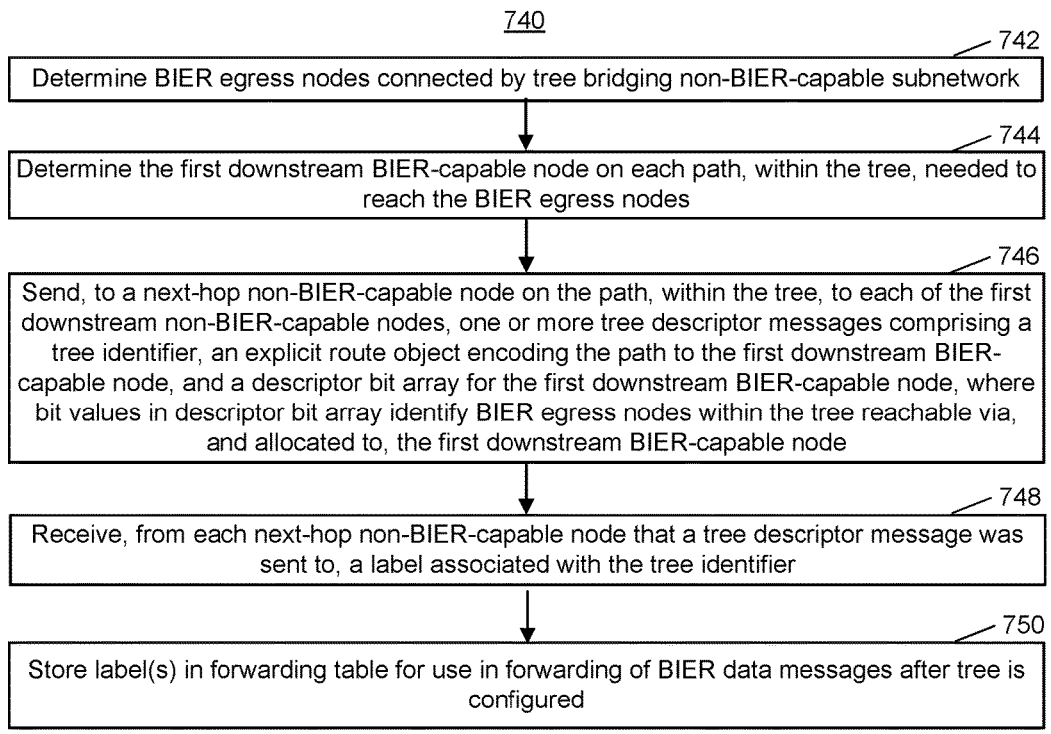
FIG. 7C is a flow chart illustrating an embodiment of another variation of the method of FIG. 7A.

The flowchart of FIG. 7C illustrates another variation of the method of FIG. 7A, one which may be used with non-BIER-capable nodes having no BIER capability in either the control plane or data plane. Method 740 begins in step 742 with determining the BIER egress nodes to be connected by a tree bridging a non-BIER-capable subnetwork. The node performing method 740 also determines the first downstream BIER-capable node on each path, within the tree, that is needed to reach the BIER egress nodes of the tree (step 744). In an embodiment, the determination of the first downstream BIER-capable node is done using a topology stored at the BIER-capable node performing the method, in conjunction with received IGP advertisements from BIER-capable nodes.

Method 740 continues at step 746 with sending, to a next hop non-BIER-capable node on the path, within the tree, to each of the first downstream non-BIER-capable nodes, one or more tree descriptor messages. Each tree descriptor message comprises a tree identifier, an explicit route object encoding the path to the first downstream BIER-capable node, and a descriptor bit array for the first downstream BIER-capable node. Bit values in the descriptor bit array identify BIER egress nodes within the tree that are reachable via, and allocated to, the first downstream BIER-capable node. Step 746 may be better understood with reference to FIGS. 6A-6C in which three different descriptor bit arrays, in payload objects 606, 610 and 614, are directed toward a respective three downstream BIER capable nodes: nodes B, D and C, respectively. These three descriptor bit arrays may be sent within a single message, such as an RSVP Path message, in some embodiments. Alternatively, the descriptor bit arrays may be sent using separate messages.

Method 740 continues in step 748 with receiving, from each next-hop non-BIER capable node that a tree descriptor message was sent to, a label associated with the tree identifier. The received labels are then stored in a forwarding table for use in forwarding of BIER data messages after the tree is configured.

Figure 8A:
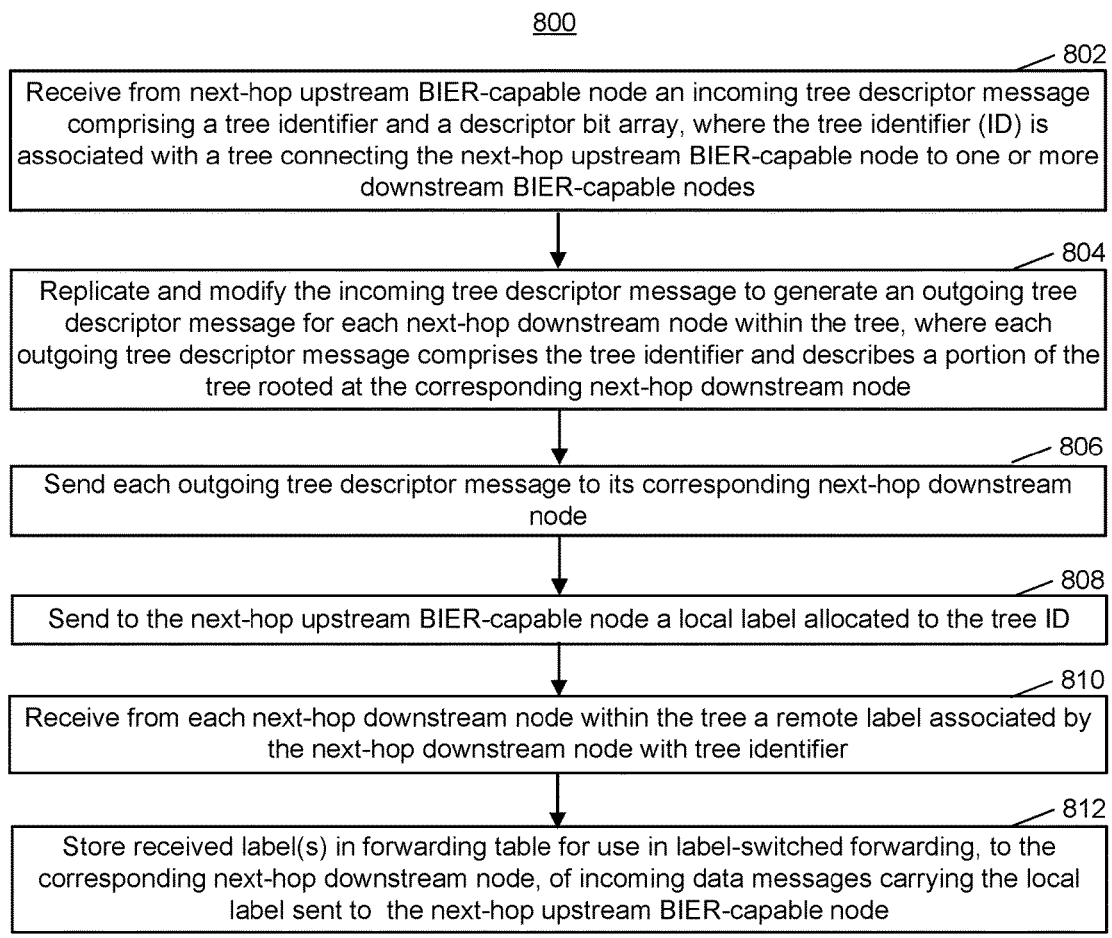
FIG. 8A is a flow chart illustrating an embodiment of a configuration method performed at a node within a non-BIER-capable subnetwork as described herein.

An embodiment of a configuration method which may be performed at a first node within a non-BIER-capable subnetwork, such as node E of network 200, is illustrated by the flowchart of FIG. 8A. Method 800 of FIG. 8A begins in step 802 with receiving, from a next-hop upstream BIER-capable node, an incoming tree descriptor message comprising a tree identifier and a descriptor bit array, where the tree identifier is associated with a tree connecting the next-hop upstream BIER-capable node to one or more downstream BIER-capable nodes. The method continues with replicating and modifying the incoming tree descriptor message to generate an outgoing tree descriptor message for each next-hop downstream node within the tree (step 804). Each outgoing tree descriptor message comprises the tree identifier and describes a portion of the tree rooted at the corresponding next-hop downstream node. Each of the outgoing tree descriptor messages is sent to its corresponding next-hop downstream node (step 806). Method 800 further includes sending to the next-hop upstream BIER-capable node a local label allocated to the tree identifier (step 808), and receiving from each next-hop downstream node within the tree a remote label associated by the next-hop downstream node with the tree identifier (step 810). Received labels are stored in a forwarding table for use in label-switched forwarding, to the corresponding next-hop downstream node, of incoming data messages carrying the local label sent to the next-hop upstream BIER-capable node.

Figure 8B:
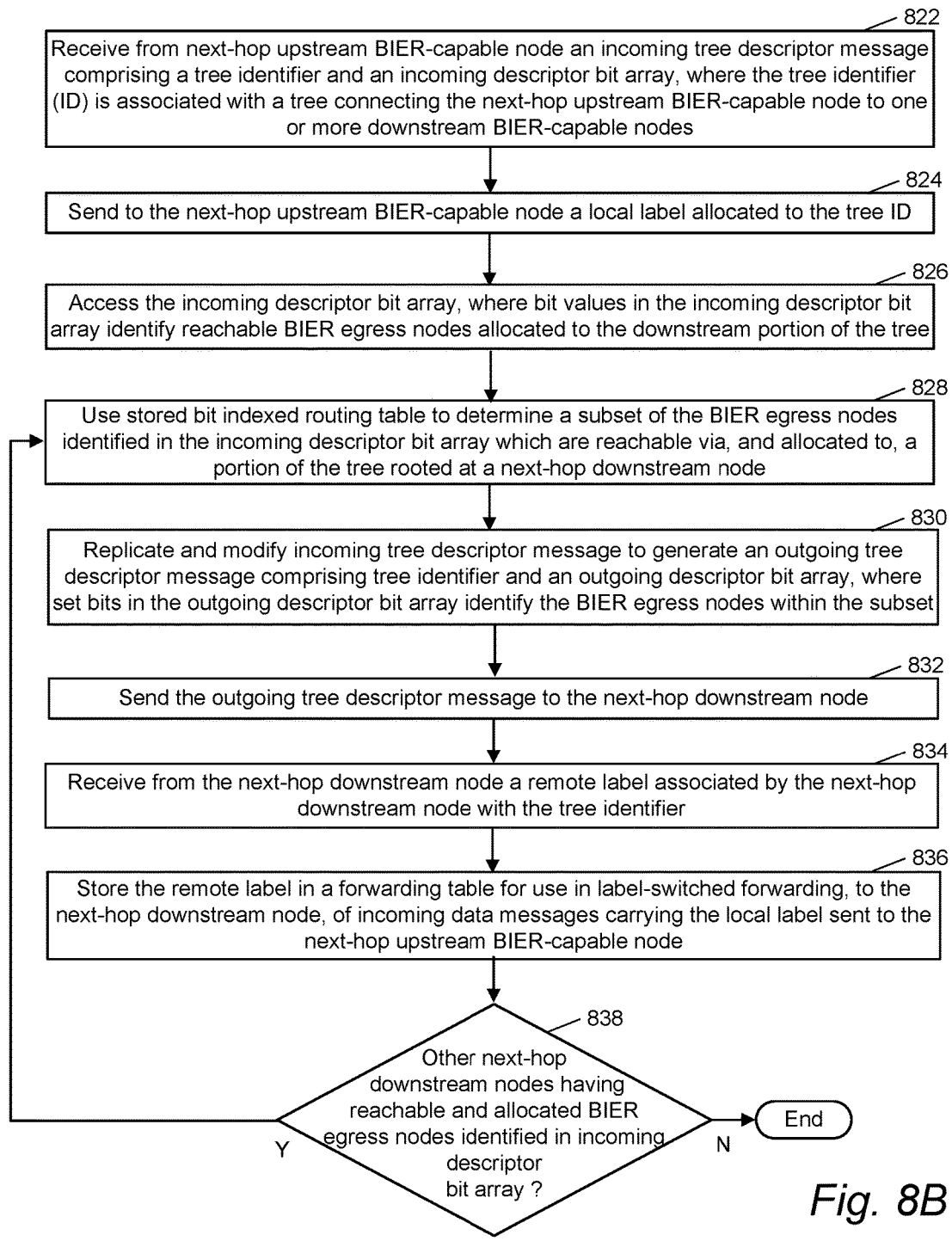
FIG. 8B is a flow chart illustrating an embodiment of a variation of the method of FIG. 8A.

The flowchart of FIG. 8B illustrates a variation of the method of FIG. 8A which may be used with non-BIER-capable nodes having BIER control-plane capability. Method 820 of FIG. 8B begins at step 822 with receiving, from a next-hop upstream BIER-capable node, an incoming tree descriptor message comprising a tree identifier and an incoming descriptor bit array, where the tree identifier is associated with a tree connecting the next-hop upstream BIER-capable node to one or more downstream BIER-capable nodes. Method 820 continues with sending to the next-hop upstream BIER-capable node a local label allocated to the tree identifier. The node performing method 820 (a non-BIER-forwarding node having BIER control-plane capability) accesses the incoming descriptor bit array, where bit values in the incoming descriptor bit array identify reachable BIER ingress nodes allocated to the downstream portion of the tree (step 826). Method 820 continues with using a stored bit indexed routing table to determine a subset of the BIER egress nodes identified in the incoming descriptor bit array which are reachable via, and allocated to, a portion of the tree rooted at a next-hop downstream node (step 828).

The node performing method 820 then replicates and modifies the incoming tree descriptor message to generate an outgoing tree descriptor message comprising the tree identifier and an outgoing descriptor bit array (step 830). The set bits in the outgoing descriptor bit array identify the BIER egress nodes within the subset determined in step 828. The outgoing tree descriptor message is then sent to the next-hop downstream node (step 832). An example of sending of an outgoing tree descriptor message comprising an outgoing descriptor bit array is illustrated in FIG. 4B, where node E generates and sends outgoing tree descriptor messages 406, 412 and 416 to next-hop downstream nodes C, F and G, respectively. Method 820 continues with receiving from the next-hop downstream node a remote label associated by the next-hop downstream node with the tree identifier (step 834). The received remote label is stored in a forwarding table for use in label-switched forwarding, to the next-hop downstream node, of incoming data messages carrying the local label sent to the next-hop upstream BIER-capable node (step 836). Steps 828 through 836 are repeated for any other next-hop downstream nodes included in the tree (decision step 838).

Figure 8C:
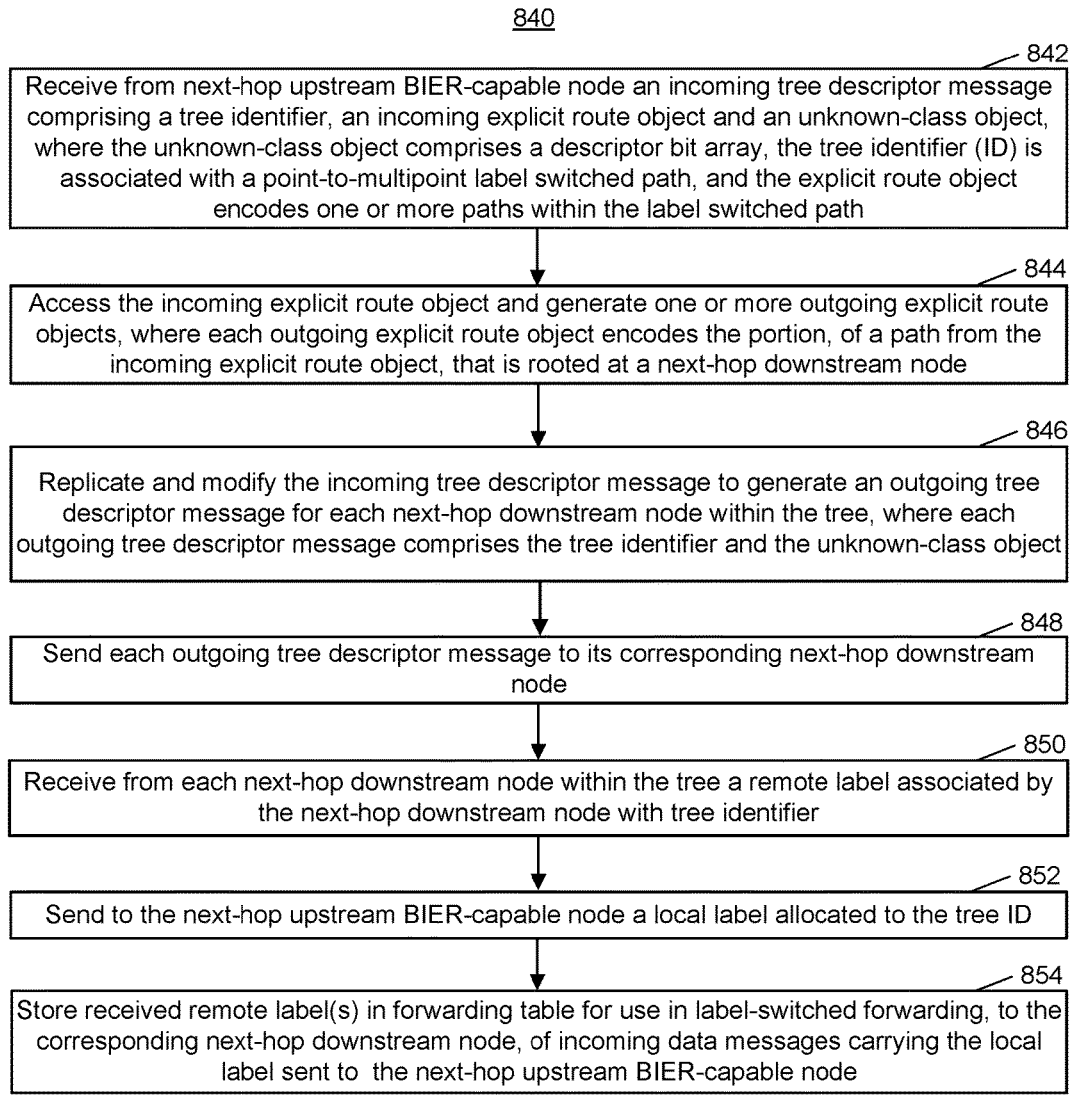
FIG. 8C is a flow chart illustrating an embodiment of another variation of the method of FIG. 8A.

The flowchart of FIG. 8C illustrates another variation of the method of FIG. 8A, one which may be used with non-BIER-capable nodes having no BIER capability in either the control plane or data plane. Method 840 of FIG. 8C begins at step 842 with receiving from a next-hop upstream BIER-capable node an incoming tree descriptor message comprising a tree identifier, an explicit route object and an unknown-class object. The unknown-class object comprises a descriptor bit array, the tree identifier is associated with a point-to-multipoint label switched path, and the explicit route object encodes one or more paths within the label switched path. The method continues with accessing the incoming explicit route object and generating one or more outgoing explicit route objects (step 844). Each outgoing explicit route object encodes the portion, of a path from the incoming explicit route object, that is rooted at a next-hop downstream node.

The node performing method 840 replicates and modifies the incoming tree descriptor message to generate an outgoing tree descriptor message for each next-hop downstream node within the tree (step 846). Each outgoing tree descriptor message comprises the tree identifier and the unknown-class object. Each outgoing tree descriptor message is sent to its corresponding next-hop downstream node (step 848). An example of sending outgoing tree descriptor messages to a corresponding next-hop downstream nodes is illustrated in FIG. 6B, where node E sends outgoing tree descriptor messages 620, 630 and 640 to next-hop downstream nodes C, F and G, respectively. Method 840 continues with receiving from each next-hop downstream node within the tree a remote label associated by the next-hop downstream node with the tree identifier (step 850). The node performing method 840 sends to the next-hop upstream BIER-capable node a local label allocated to the tree identifier (step 852). The received remote labels are stored in a forwarding table for use in label-switched forwarding, to the corresponding next-hop downstream node, of incoming data messages carrying the local label sent to the next-hop upstream BIER-capable node (step 854).

Figure 9:
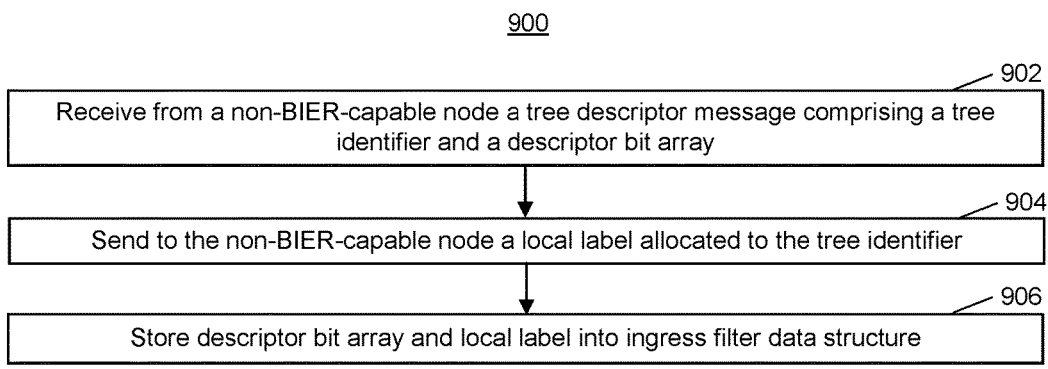
FIG. 9 is a flow chart illustrating an embodiment of a configuration method performed at a BIER-capable node just downstream of a non-BIER-capable subnetwork as described herein.

An embodiment of a configuration method which may be performed at a first BIER-capable node downstream of a non-BIER-capable subnetwork (such as nodes B or D of network 200) is illustrated by the flowchart of FIG. 9. Method 900 of FIG. 9 begins in step 902 with receiving from a non-BIER-capable node a tree descriptor message comprising a tree identifier and a descriptor bit array. The method continues with sending to the non-BIER-capable node a local label allocated to the tree identifier (step 904), and storing the descriptor bit array and local label into an ingress filter data structure (step 906).

Figure 10:
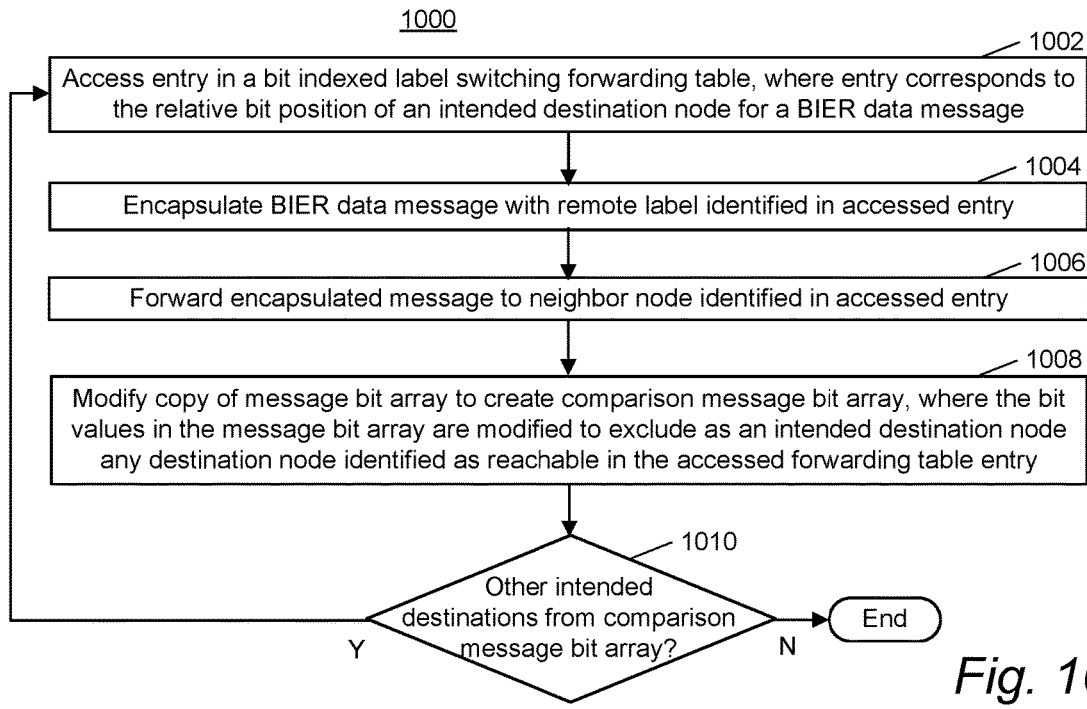
FIG. 10 is a flow chart illustrating an embodiment of a forwarding method performed at a BIER-capable node just upstream of a non-BIER-capable subnetwork as described herein.

An embodiment of a forwarding method which may be performed at a BIER-capable node just upstream of a non-BIER-capable subnetwork (such as node A of network 200) is illustrated by the flowchart of FIG. 10. Method 1000 of FIG. 10 begins in step 1002 with accessing an entry in a bit indexed label switching forwarding table, where the entry corresponds to the relative bit position of an intended destination node for a BIER data message. A "bit indexed label switching forwarding table" as used herein is a hybrid forwarding table such as table 500 of FIG. 5A. A forwarding table entry can correspond to a relative bit position of an intended destination node if the bit position of the destination node, as indicated by the message bit array of the BIER message, appears in a bit position column of the forwarding table. Alternatively or in addition, a forwarding table entry can correspond to a relative bit position of a destination node if the bit position corresponds to a reachable destination indicated by a neighbor bit array in the forwarding table.

Method 1000 continues with encapsulating the BIER data message with a remote label identified in the accessed forwarding table entry (step 1004). In an embodiment of forwarding using table 500 of FIG. 5A, encapsulation with the remote label involves pushing remote label AE1 onto a label stack of an MPLS-encapsulated BIER message. The encapsulated BIER message is forwarded to the neighbor node identified in the accessed forwarding table entry (step 1006). Method 1000 continues with modifying a copy of the message bit array to create a comparison message bit array, where the bit values in the message bit array are modified to exclude as an intended destination node any destination node identified as reachable in the accessed forwarding table entry (step 1008). The modification of step 1008 may help to avoid packet duplication in an embodiment where the forwarding table is sorted by bit position so that multiple forwarding table entries can result in forwarding to the same neighbor node. If the comparison message bit array indicates that other intended destination nodes have not yet been forwarded to ("yes" branch of decision step 1010), steps 1002 through 1008 are repeated using a different forwarding table entry.

Figure 11:
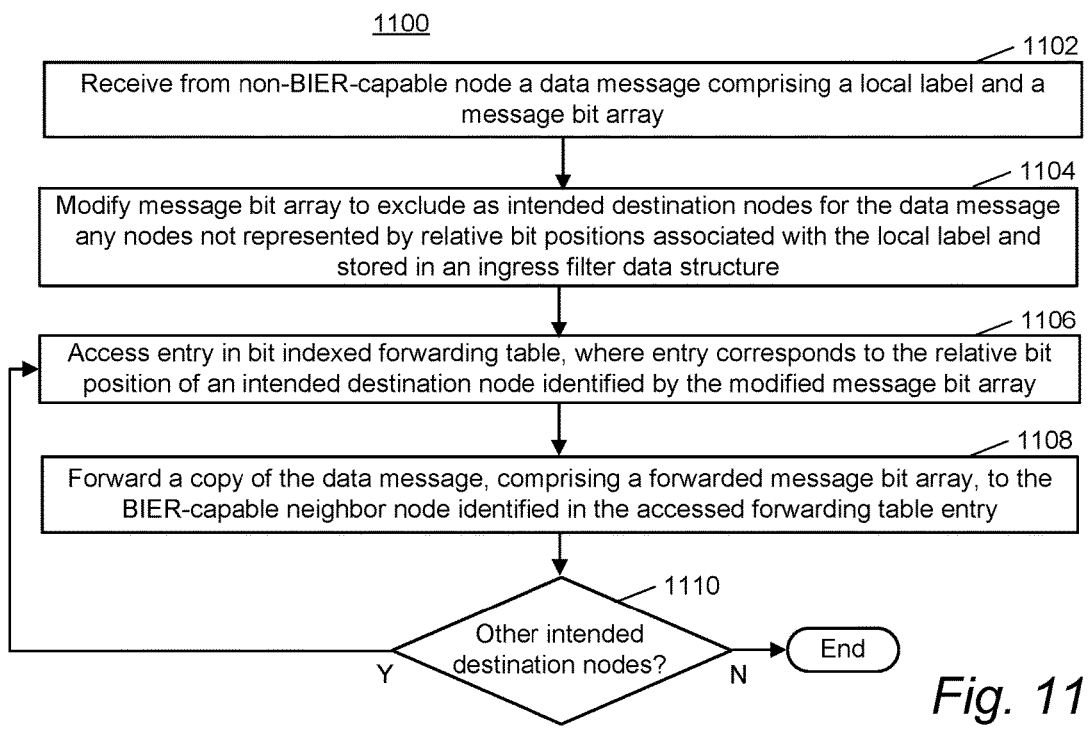
FIG. 11 is a flow chart illustrating an embodiment of a forwarding method performed at a BIER-capable node just downstream of a non-BIER-capable subnetwork as described herein.

An embodiment of a forwarding method which may be performed at a BIER-capable node just downstream of a non-BIER-capable subnetwork (such as nodes B or D of network 200) is illustrated by the flowchart of FIG. 11. Method 1100 of FIG. 11 begins at step 1102 with receiving from a non-BIER-capable node a data message comprising a local label and a message bit array. The message bit array is modified to exclude as destination nodes for the data message any nodes not represented by relative bit positions associated with the local label and stored in an ingress filter data structure (step 1104). Method 1100 continues with accessing an entry in a bit indexed forwarding table, where the entry corresponds to the relative bit position of an intended destination node identified by the modified message bit array (step 1106). A copy of the data message, comprising a forwarded message bit array, is forwarded to the BIER-capable neighbor node identified in the accessed forwarding table entry (step 1108). If other intended destination nodes, based on the modified message bit array, have not been forwarded to ("yes" branch of decision step 1110), steps 1106 and 1108 are repeated using a different forwarding table entry.

Simplified block diagrams illustrating certain embodiments of network devices that may be used with one or more of the networks described herein are shown in FIGS. 12A through 12D. In an embodiment, network device 1200 of FIG. 12A comprises a BIER-capable node just upstream of a non-BIER-capable network as described herein. Network device 1200 includes one or more network interfaces 1202, a processor 1204 and a collection of memory locations 1206. Memory locations 1206 store a routing engine 1208, forwarding engine 1210, tree configuration module 1112, one or more routing tables 1214, and one or more forwarding tables 1218.

Network interface 1202 is configured for both sending and receiving both messages and control information, such as IGP advertisements, within a network. In an embodiment, network interface 1202 comprises multiple interfaces and can accommodate multiple communications protocols and control protocols, including those for communication between network nodes or between a network node and a network controller. Each interface may be a physical interface or a logical interface. Memory locations 1206 include a plurality of storage locations addressable by processor 1204 for storing software programs and data structures associated with the methods described herein. As such, memory locations 1206 may be implemented using any combination of built-in volatile or non-volatile memory, including random-access memory (RAM) and read-only memory (ROM) and integrated or peripheral storage devices such as magnetic disks, optical disks, solid state drives or flash drives.

Figure 12A:
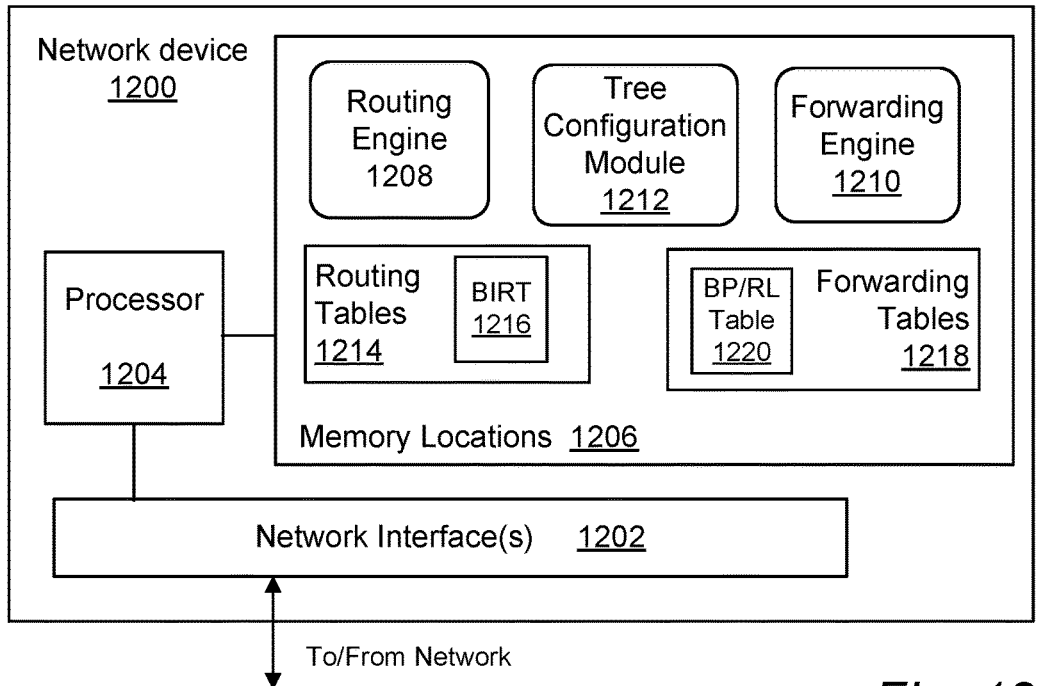
FIGS. 12A through 12D are simplified block diagrams illustrating embodiments of example network devices that may be employed in the networks described herein.

In the embodiment of FIG. 12A, memory locations 1206 store a forwarding engine 1210 and routing engine 1208. Forwarding engine 1210 includes computer executable instructions that when executed by processor 1204 are operable to perform operations associated with forwarding of received messages. In an embodiment, forwarding engine 1210 performs forwarding operations using a hybrid BIER and label switching forwarding table included in forwarding tables 1218. As such forwarding tables 1218 include a bit position/remote label ("BP/RL") forwarding table 1220. An example of such a table is forwarding table 500 of FIG. 5A. Routing engine 1208 includes computer executable instructions that when executed by processor 1204 are operable to perform operations such as receiving network topology information via communications such as IGP advertisements or network controller communications, generating a bit indexed routing table 1216 reflecting network topology, router identifiers, and bit positions, and generating a forwarding table such as BP/RL forwarding table 1220 from the routing table. In an embodiment, routing engine 1208 is also configured to generate non-BIER routing and forwarding tables, such as, for example, IP or MPLS/IP routing and forwarding tables or information bases. Alternatively or in addition, routing engine 1208 may generate BIER forwarding tables for BIER forwarding into a BIER-capable portion of a network.

Memory locations 1206 also store a tree configuration module 1212. Tree configuration module 1212 includes computer executable instructions that when executed by processor 1204 are operable to perform operations such as determining BIER egress nodes connected by an intended tree, generating and sending a tree descriptor message comprising a tree identifier and a descriptor bit array, and receiving and storing labels associated with the tree identifier. In an embodiment, some or all of the functions of tree configuration module 1212 may be incorporated into routing engine 1208 and/or forwarding engine 1210.

Figure 12B:
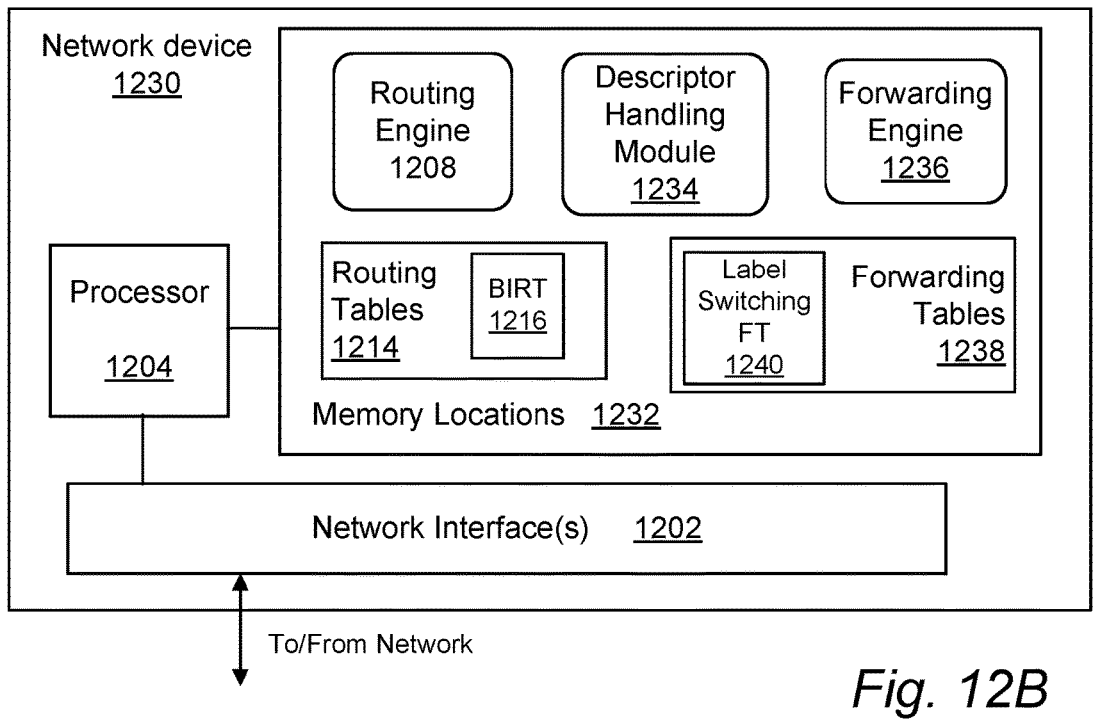

Certain components of an embodiment of another network device are illustrated by the simplified block diagram of FIG. 12B. In an embodiment, network device 1230 of FIG. 12B comprises a non-BIER-forwarding node having BIER control plane capability. In addition to network interface 1202 and processor 1204 as described above for network device 1200, network device 1230 includes a collection of memory locations 1232 storing a descriptor handling module 1234, forwarding engine 1236 and forwarding tables 1238, along with routing engine 1208 and routing tables 1214 as described above for network device 1200. Memory locations 1232 are similar to memory locations 1206 described above in connection with network device 1200, except for differences in the modules and data stored.

Descriptor handling module 1234 includes computer executable instructions that when executed by processor 1204 are operable to perform operations such as receiving an incoming tree descriptor message comprising an incoming descriptor bit array, and replicating and modifying the incoming tree descriptor message to generate an outgoing tree descriptor message comprising an outgoing descriptor bit array. Forwarding engine 1236 differs from forwarding engine 1210 of network device 1200 in that forwarding engine 1236 is configured for forwarding by label switching rather than BIER forwarding. Forwarding tables 1238 include a label switching forwarding table 1240.

Figure 12C:
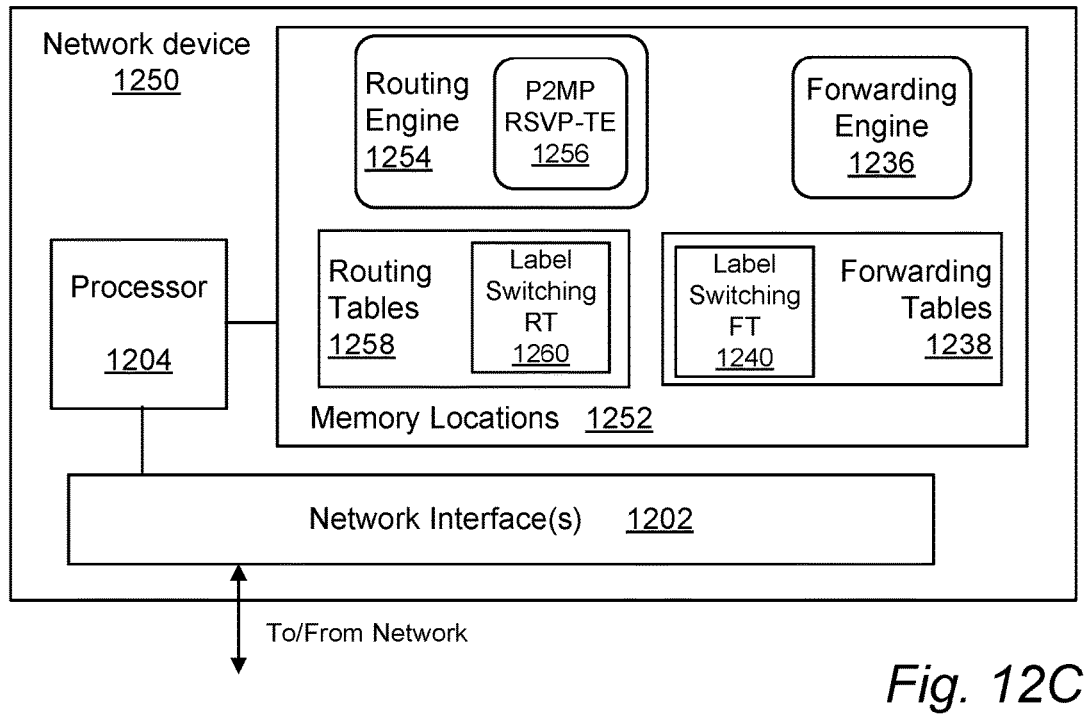

Certain components of an embodiment of another network device are illustrated by the simplified block diagram of FIG. 12C. In an embodiment, network device 1250 of FIG. 12C comprises a non-BIER-forwarding node having no BIER capability in either the control plane or data plane. In addition to network interface 1202 and processor 1204 as described above for network device 1200, network device 1250 includes a collection of memory locations 1252 storing a routing engine 1254 and routing tables 1258 along with forwarding engine 1236 and forwarding tables 1238 as described above for network device 1230. Memory locations 1252 are similar to memory locations 1206 described above in connection with network device 1200, except for differences in the modules and data stored. Routing engine 1254 differs from routing engine 1208 of network device 1200 in that routing engine 1254 is not configured to handle BIER bit positions or other BIER information. Routing engine 1254 includes P2MP RSVP-TE capability 1256 in the embodiment of FIG. 12C. Routing tables 1258 include a label switching routing table 1260.

Figure 12D:
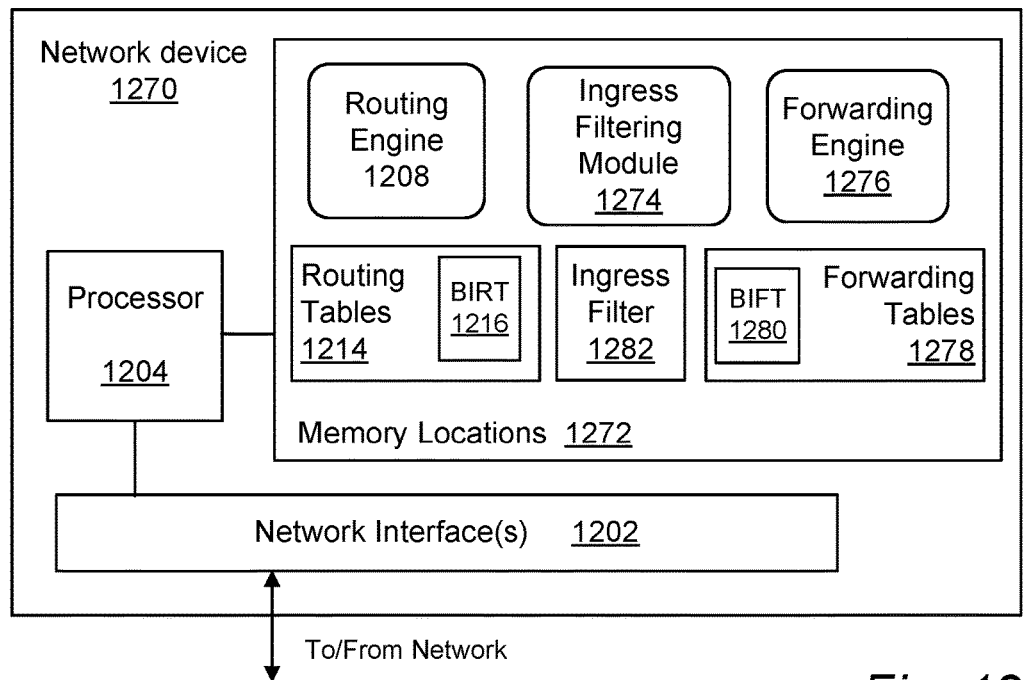

Certain components of an embodiment of still another network device are illustrated by the simplified block diagram of FIG. 12D. In an embodiment, network device 1270 of FIG. 12D comprises a BIER-capable node just downstream of a non-BIER-capable network as described herein. In addition to network interface 1202 and processor 1204 as described above for network device 1200, network device 1270 includes a collection of memory locations 1272 storing an ingress filtering module 1274, forwarding engine 1276 and forwarding tables 1278 along with routing engine 1208 and routing tables 1214 as described above for network device 1200. Memory locations 1272 are similar to memory locations 1206 described above in connection with network device 1200, except for differences in the modules and data stored.

Ingress filtering module 1274 includes computer executable instructions that when executed by processor 1204 are operable to perform operations such as receiving a tree descriptor message comprising a tree identifier and a descriptor bit array, allocating a local label to the tree identifier, storing the descriptor bit array and the local label into an ingress filter data structure, and modifying a message bit array from a received BIER message to exclude as intended destination nodes for the data message any nodes not represented by relative bit positions stored in the ingress filter data structure. In an embodiment, some or all of the functions of ingress filtering module 1274 may be incorporated into routing engine 1208 and/or forwarding engine 1276. Forwarding engine 1276 differs from forwarding engines in the other network devices described above in that forwarding engine 1276 is configured to support standard BIER forwarding. Forwarding tables 1278 include a bit indexed forwarding table 1280.

Certain examples of network device configurations are illustrated in FIGS. 12A through 12D. Multiple alternatives and variations to these examples will be apparent to one of ordinary skill in the art in view of this disclosure. In some embodiments, the functions of processor 1204 in devices 1200, 1230, 1250 and/or 1270 may be implemented using a combination of multiple processors. Moreover, embodiments of a network device contemplated herein may include additional components not shown. Software modules and engines described herein may take various forms understood to one of ordinary skill in the art in view of this disclosure. A single module or engine described herein may in some embodiments be implemented by a combination of multiple files or programs. Alternatively or in addition, one or more functions associated with modules or engines delineated separately herein may be combined into a single file or program.

Figure 13:
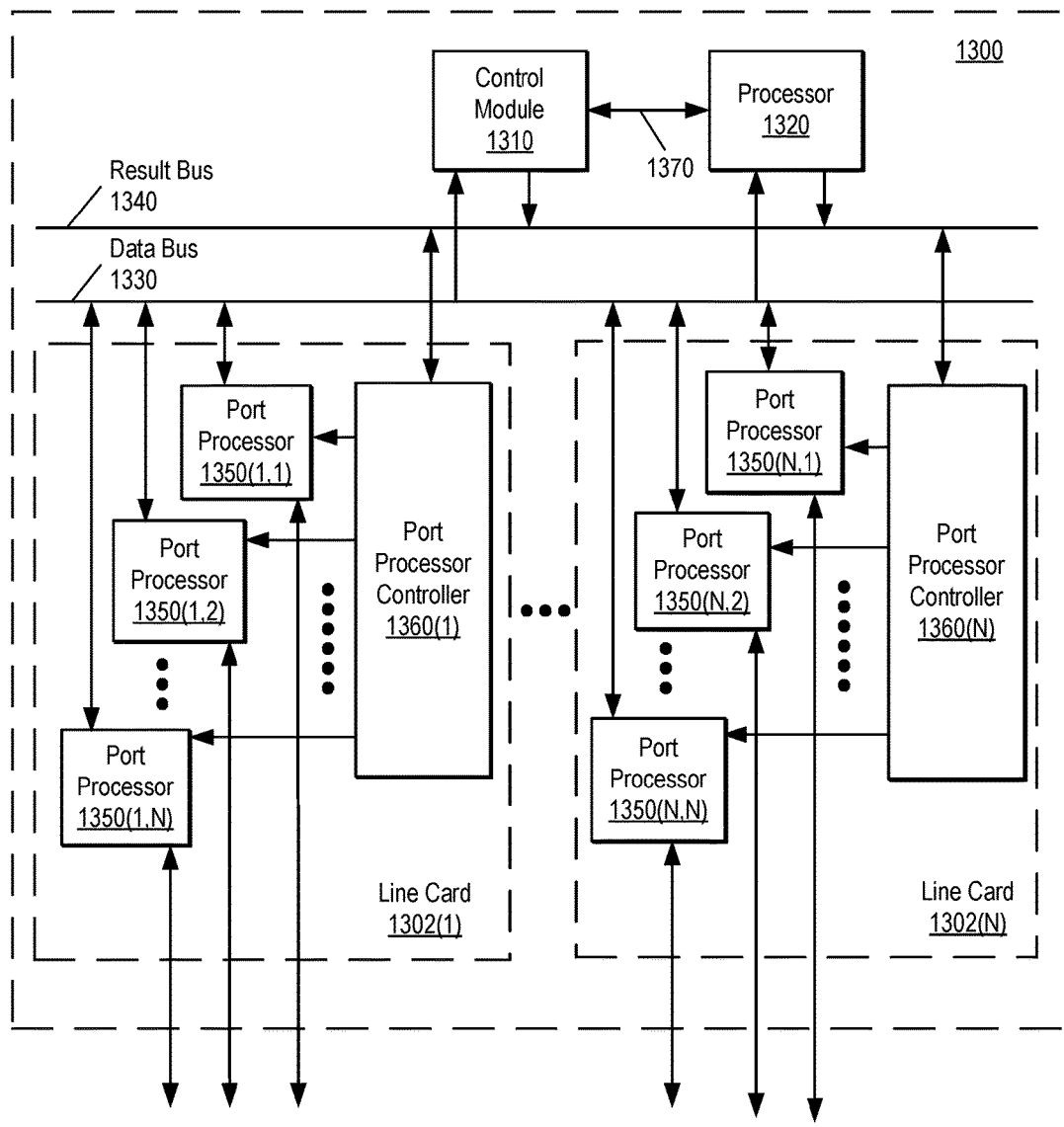
FIG. 13 is a simplified block diagram illustrating certain components of an example network device that may be employed in the networks described herein.

FIG. 13 is a block diagram providing an additional illustration of a network device that may act as, or be associated with, a node in one of the networks described herein. FIG. 13 depicts (at least in part) one configuration of a network device or a network routing element (e.g., a hub, router, switch, or similar device) 1300. In this depiction, network device 1300 includes a number of line cards (line cards 1302(1)-1302(N)) that are communicatively coupled to a control module 1310 and route processor 1320 via a data bus 1330 and result bus 1340. In an embodiment, line cards 1302(1)-1302(N), along with data bus 1330 and result bus 1340, form at least a portion of a network interface such as network interface(s) 1202 of FIGS. 12A-12D. Control module 1310 may in an embodiment include engines, modules and data structures such as forwarding engine 1210, routing engine 1208, tree configuration module 1212, forwarding table(s) 1218 and routing table(s) 1214 of FIG. 12A-11C. Line cards 1202(1)-(N) include a number of port processors 1250(1, 1)-(N, N) which are controlled by port processor controllers 1260(1)-(N). Control module 1210 and processor 1220 are not only coupled to one another via data bus 1230 and result bus 1240, but are also communicatively coupled to one another by a communications link 1270. It is noted that in alternative embodiments, each line card can include its own forwarding engine.

When a message (e.g., a packet) is received at network device 1200, the message may be identified and analyzed in the following manner. Upon receipt, a message (or some or all of its control information) is sent from the one of port processors 1250(1, 1)-(N, N) at which the message was received to one or more of those devices coupled to data bus 1230 (e.g., others of port processors 1250(1, 1)-(N, N), control module 1210 and/or route processor 1220). Handling of the message can be determined, for example, by control module 1210. For example, a forwarding engine within control module 1210 may determine that the message is to be forwarded to one or more of port processors 1250(1, 1)-(N, N). This can be accomplished by indicating to corresponding one(s) of port processor controllers 1260(1)-(N) that the copy of the message held in the given one(s) of port processors 1250(1,1)-(N,N) is to be forwarded to the appropriate one of port processors 1250(1,1)-(N,N). Network devices described herein, such as network devices 1200, 1230, 1250 and 1270, include one or more processors such as processor 1204 and processor 1320, which may take the form of, for example, microprocessors, PLDs (Programmable Logic Devices), or ASICs (Application Specific Integrated Circuits). These processors are configured to execute program instructions stored in computer readable storage media of various types, including RAM (Random Access Memory), ROM (Read Only Memory), Flash memory, MEMS (Micro Electro-Mechanical Systems) memory, and the like.

Figure 14:
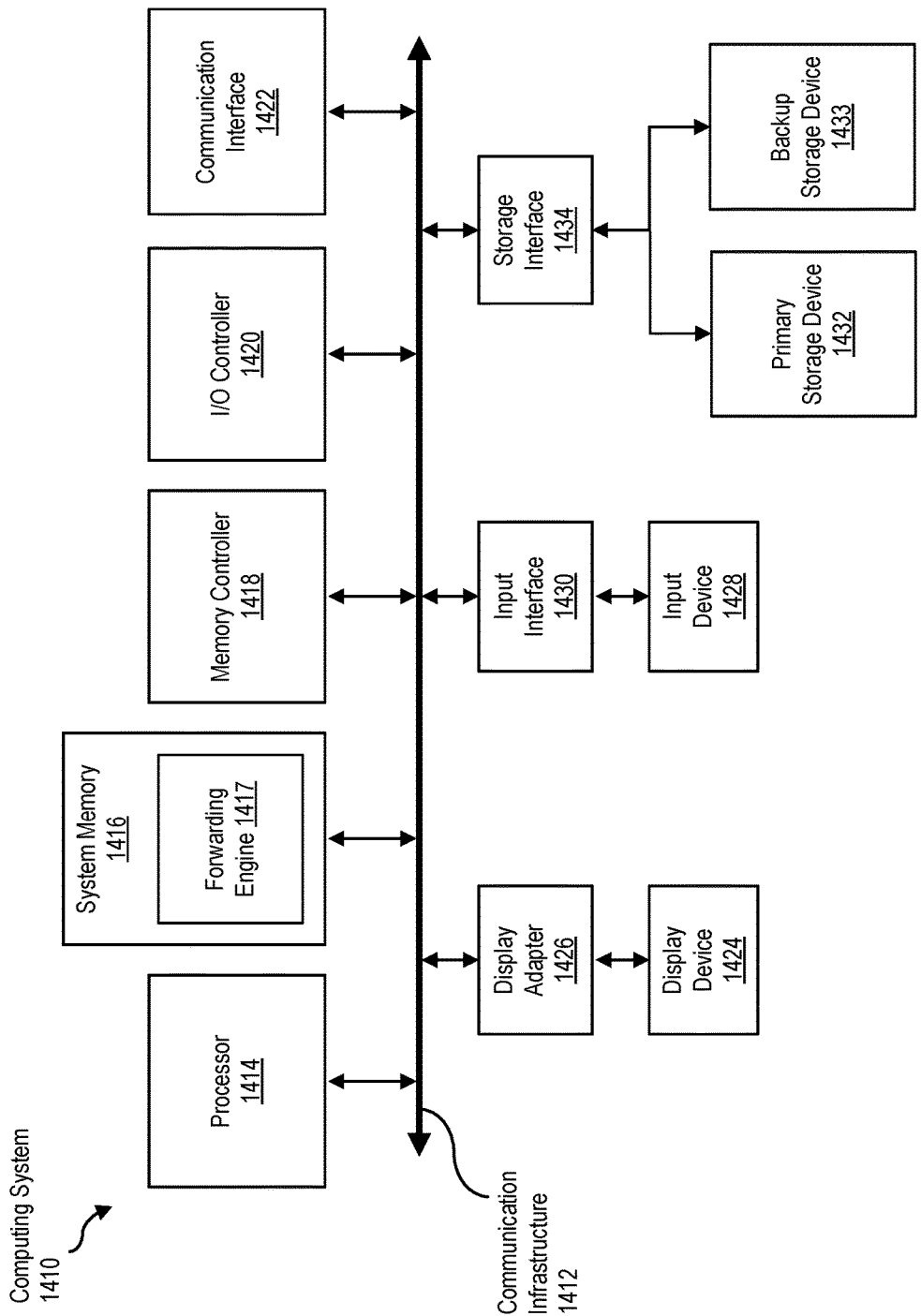
FIG. 14 is a simplified block diagram depicting a computer system suitable for implementing embodiments of the devices and systems described herein.

FIG. 14 depicts a block diagram of a computing system 1410 suitable for implementing aspects of the systems described herein. In the embodiment of FIG. 14, computing system 1410 implements a forwarding engine 1417. Embodiments of the computing system of FIG. 14 can, alternatively or in addition, implement various other engines and modules described in this disclosure. Computing system 1410 broadly represents any single or multi-processor computing device or system capable of executing computer-readable instructions. Examples of computing system 1410 include, without limitation, any one or more of a variety of devices including workstations, personal computers, laptops, client-side terminals, servers, distributed computing systems, handheld devices (e.g., personal digital assistants and mobile phones), network appliances, switches, routers, storage controllers (e.g., array controllers, tape drive controller, or hard drive controller), and the like. In its most basic configuration, computing system 1410 may include at least one processor 1414 and a system memory 1416. By executing the software that implements a forwarding engine 1417, computing system 1410 becomes a special purpose computing device that is configured to perform message forwarding in manners described elsewhere in this disclosure.

Processor 1414 generally represents any type or form of processing unit capable of processing data or interpreting and executing instructions. In certain embodiments, processor 1414 may receive instructions from a software application or module. These instructions may cause processor 1414 to perform the functions of one or more of the embodiments described and/or illustrated herein. System memory 1416 generally represents any type or form of volatile or non-volatile storage device or medium capable of storing data and/or other computer-readable instructions. Examples of system memory 1416 include, without limitation, random access memory (RAM), read only memory (ROM), flash memory, or any other suitable memory device. The ROM or flash memory can contain, among other code, the Basic Input-Output System (BIOS) which controls basic hardware operation such as the interaction with peripheral components. Although not required, in certain embodiments computing system 1410 may include both a volatile memory unit (such as, for example, system memory 1416) and a non-volatile storage device (such as, for example, primary storage device 1432, as described further below). In one example, program instructions executable to implement a forwarding engine configured to forward messages using bit indexed explicit replication (BIER) may be loaded into system memory 1416.

In certain embodiments, computing system 1410 may also include one or more components or elements in addition to processor 1414 and system memory 1416. For example, as illustrated in FIG. 14, computing system 1410 may include a memory controller 1418, an Input/Output (I/O) controller 1420, and a communication interface 1422, each of which may be interconnected via a communication infrastructure 1412. Communication infrastructure 1412 generally represents any type or form of infrastructure capable of facilitating communication between one or more components of a computing device. Examples of communication infrastructure 1412 include, without limitation, a communication bus (such as an Industry Standard Architecture (ISA), Peripheral Component Interconnect (PCI), PCI express (PCIe), or similar bus) and a network.

Memory controller 1418 generally represents any type or form of device capable of handling memory or data or controlling communication between one or more components of computing system 1410. For example, in certain embodiments memory controller 1418 may control communication between processor 1414, system memory 1416, and I/O controller 1420 via communication infrastructure 1412. In certain embodiments, memory controller 1418 may perform and/or be a means for performing, either alone or in combination with other elements, one or more of the operations or features described and/or illustrated herein. I/O controller 1420 generally represents any type or form of module capable of coordinating and/or controlling the input and output functions of a computing device. For example, in certain embodiments I/O controller 1420 may control or facilitate transfer of data between one or more elements of computing system 1410, such as processor 1414, system memory 1416, communication interface 1422, display adapter 1426, input interface 1430, and storage interface 1434.

Communication interface 1422 broadly represents any type or form of communication device or adapter capable of facilitating communication between computing system 1410 and one or more additional devices. For example, in certain embodiments communication interface 1422 may facilitate communication between computing system 1410 and a private or public network including additional computing systems. Examples of communication interface 1422 include, without limitation, a wired network interface (such as a network interface card), a wireless network interface (such as a wireless network interface card), a modem, and any other suitable interface. In at least one embodiment, communication interface 1422 may provide a direct connection to a remote server via a direct link to a network, such as the Internet. Communication interface 1422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1422 may also represent a host adapter configured to facilitate communication between computing system 1410 and one or more additional network or storage devices via an external bus or communications channel Examples of host adapters include, without limitation, Small Computer System Interface (SCSI) host adapters, Universal Serial Bus (USB) host adapters, Institute of Electrical and Electronics Engineers (IEEE) 11054 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like. Communication interface 1422 may also allow computing system 1410 to engage in distributed or remote computing. For example, communication interface 1422 may receive instructions from a remote device or send instructions to a remote device for execution.

As illustrated in FIG. 14, computing system 1410 may also include at least one display device 1424 coupled to communication infrastructure 1412 via a display adapter 1426. Display device 1424 generally represents any type or form of device capable of visually displaying information forwarded by display adapter 1426. Similarly, display adapter 1426 generally represents any type or form of device configured to forward graphics, text, and other data from communication infrastructure 1412 (or from a frame buffer) for display on display device 1424. Computing system 1410 may also include at least one input device 1428 coupled to communication infrastructure 1412 via an input interface 1430. Input device 1428 generally represents any type or form of input device capable of providing input, either computer or human generated, to computing system 1410. Examples of input device 1428 include, without limitation, a keyboard, a pointing device, a speech recognition device, or any other input device.

As illustrated in FIG. 14, computing system 1410 may also include a primary storage device 1432 and a backup storage device 1433 coupled to communication infrastructure 1412 via a storage interface 1434. Storage devices 1432 and 1433 generally represent any type or form of storage device or medium capable of storing data and/or other computer-readable instructions. For example, storage devices 1432 and 1433 may include a magnetic disk drive (e.g., a so-called hard drive), a floppy disk drive, a magnetic tape drive, an optical disk drive, a flash drive, or the like. Storage interface 1434 generally represents any type or form of interface or device for transferring data between storage devices 1432 and 1433 and other components of computing system 1410. A storage device like primary storage device 1432 can store information such as routing tables and forwarding tables.

In certain embodiments, storage devices 1432 and 1433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1432 and 1433 may also include other similar structures or devices for allowing computer software, data, or other computer-readable instructions to be loaded into computing system 1410. For example, storage devices 1432 and 1433 may be configured to read and write software, data, or other computer-readable information. Storage devices 1432 and 1433 may be a part of computing system 1410 or may in some embodiments be separate devices accessed through other interface systems.

Many other devices or subsystems may be connected to computing system 1410. Conversely, all of the components and devices illustrated in FIG. 14 need not be present to practice the embodiments described and/or illustrated herein. The devices and subsystems referenced above may also be interconnected in different ways from that shown in FIG. 14.

Computing system 1410 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 1410 for storage in memory via a network such as the Internet or upon a carrier medium. The computer-readable medium containing the computer program may be loaded into computing system 1410. All or a portion of the computer program stored on the computer-readable medium may then be stored in system memory 1416 and/or various portions of storage devices 1432 and 1433. When executed by processor 1414, a computer program loaded into computing system 1410 may cause processor 1414 to perform and/or be a means for performing the functions of one or more of the embodiments described and/or illustrated herein. Additionally or alternatively, one or more of the embodiments described and/or illustrated herein may be implemented in firmware and/or hardware. For example, computing system 1410 may be configured as an application specific integrated circuit (ASIC) adapted to implement one or more of the embodiments disclosed herein.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

Although the present disclosure includes several embodiments, the disclosure is not intended to be limited to the specific forms set forth herein. On the contrary, it is intended to cover such alternatives, modifications, and equivalents as can be reasonably included within the scope defined by the appended claims.

What is claimed is:

1. A method, comprising:
   receiving, from a first network node not configured for bit indexed forwarding, a data message comprising a local label and a message bit array, wherein
       each of a plurality of network destination nodes is represented by a relative bit position within the message bit array, and
       bit values in the message bit array identify intended destination nodes for the message from among the plurality of network destination nodes;
   modifying the message bit array to exclude as intended destination nodes for the message any nodes not represented by one or more relative bit positions associated with the local label and stored in an ingress filter data structure;
   subsequent to the modifying, accessing an entry in a bit indexed forwarding table corresponding to a relative bit position of an intended destination node for the message; and
   forwarding a copy of the data message comprising a forwarded message bit array to a second network node identified in the accessed forwarding table entry, wherein the second network node is configured for bit indexed forwarding.

2. The method of claim 1, wherein the first network node does not store a bit indexed forwarding table.

3. The method of claim 2, wherein
   the first network node does store a bit indexed routing table, and
   the bit indexed routing table comprises:
       router identifiers for network nodes;
       a mapping of relative bit positions to respective represented network destination nodes within the plurality of network destination nodes; and
       a mapping of network destination nodes within the plurality of network destination nodes to respective neighbor nodes via which the destination nodes are reachable.

4. The method of claim 1, wherein
   the one or more relative bit positions associated with the local label are stored in the ingress filter data structure as a filter bit array, and
   each of the plurality of network destination nodes is represented by the same relative bit position in the filter bit array as in the message bit array.

5. The method of claim 4, wherein modifying the message bit array comprises:
   performing a bitwise logical AND operation combining the message bit array with the filter bit array; and
   replacing the message bit array with a result of the bitwise logical AND operation.

6. The method of claim 1, further comprising, prior to receiving the data message:
   receiving from the first network node a tree descriptor message comprising a descriptor bit array, wherein
       each of the plurality of network destination nodes is represented by the same relative bit position in the descriptor bit array as in the message bit array,
       bit values within the descriptor bit array identify designated network destination nodes, and
       the designated network destination nodes are destination nodes, from among the plurality of destination nodes, designated to be reached via a path including the first network node; and
   storing, in the ingress filter data structure, an identification of relative bit positions corresponding to the designated network destination nodes.

7. The method of claim 6, wherein storing the identification of relative bit positions comprises storing the descriptor bit array.

8. The method of claim 6, wherein
   the tree descriptor message further comprises a tree identifier associated with a label-switched path, and
   the tree descriptor message further comprises a label request.

9. The method of claim 8, further comprising, subsequent to receiving the tree descriptor message and prior to receiving the data message:
   allocating the local label for the label-switched path associated with the tree identifier; and
   sending the local label to the first network node.

10. The method of claim 6, wherein
    the first network node does not store a bit indexed routing table, and
    the tree descriptor message comprises an explicit route object.

11. A network device, comprising:
    a network interface;
    a processor operably coupled to the network interface and adapted to receive, from a first network node not configured for bit indexed forwarding, a data message comprising a local label and a message bit array, wherein
- each of a plurality of network destination nodes is represented by a relative bit position within the message bit array, and
- bit values in the message bit array identify intended destination nodes for the message from among the plurality of network destination nodes, modify the message bit array to exclude as intended destination nodes for the message any nodes not represented by one or more relative bit positions associated with the local label and stored in an ingress filter data structure, subsequent to modifying the message bit array, access an entry in a bit indexed forwarding table corresponding to a relative bit position of an intended destination node for the message, and forward a copy of the data message comprising a forwarded message bit array to a second network node identified in the accessed forwarding table entry, wherein the second network node is configured for bit indexed forwarding.

12. The network device of claim 11, wherein the first network node does not store a bit indexed forwarding table.

13. The network device of claim 12, wherein
the first network node does store a bit indexed routing table, and
the bit indexed routing table comprises:
- router identifiers for network nodes;
- a mapping of relative bit positions to respective represented network destination nodes within the plurality of network destination nodes; and
- a mapping of network destination nodes within the plurality of network destination nodes to respective neighbor nodes via which the destination nodes are reachable.

14. The network device of claim 11, further comprising a set of storage locations adapted to store the ingress filter data structure.

15. The network device of claim 11, wherein
the one or more relative bit positions associated with the local label are stored in the ingress filter data structure as a filter bit array, and
each of the plurality of network destination nodes is represented by the same relative bit position in the filter bit array as in the message bit array.

16. The network device of claim 15, wherein the processor is further adapted to modify the message bit array by:
performing a bitwise logical AND operation combining the message bit array with the filter bit array; and
replacing the message bit array with a result of the bitwise logical AND operation.

17. The network device of claim 11, wherein the processor is further adapted to, prior to receiving the data message:
receive from the first network node a tree descriptor message comprising a descriptor bit array, wherein
- each of the plurality of network destination nodes is represented by the same relative bit position in the descriptor bit array as in the message bit array,
- bit values within the descriptor bit array identify designated network destination nodes, and
- the designated network destination nodes are destination nodes, from among the plurality of destination nodes, designated to be reached via a path including the first network node; and store, in the ingress filter data structure, an identification of relative bit positions corresponding to the designated network destination nodes.

18. The network device of claim 17, wherein the processor is further adapted to store the identification of relative bit positions by storing the descriptor bit array.

19. The network device of claim 17, wherein
the tree descriptor message further comprises a tree identifier associated with a label-switched path, and
the tree descriptor message further comprises a label request.

20. The network device of claim 19, wherein the processor is further adapted to, subsequent to receiving the tree descriptor message and prior to receiving the data message:
allocate the local label for the label-switched path associated with the tree identifier; and
send the local label to the first network node.

* * * * *